(12) United States Patent
Asada

(10) Patent No.: US 7,864,226 B2
(45) Date of Patent: Jan. 4, 2011

(54) IMAGE SENSING APPARATUS AND CONTROL METHOD THEREOF

(75) Inventor: Satoshi Asada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 11/548,510

(22) Filed: Oct. 11, 2006

(65) Prior Publication Data

US 2007/0091338 A1    Apr. 26, 2007

(30) Foreign Application Priority Data

Oct. 21, 2005  (JP) ............................. 2005-307508

(51) Int. Cl.
  *H04N 5/76* (2006.01)
(52) U.S. Cl. .............. 348/231.99; 348/231.3; 348/231.6; 348/222.1; 348/223.1; 348/655
(58) Field of Classification Search ............ 348/231.99, 348/231.3, 231.6, 222.1, 223.1, 655; 382/162, 382/167; 345/603, 604
See application file for complete search history.

(56) References Cited

U.S. PATENT DOCUMENTS

| | | | |
|---|---|---|---|
| 4,763,186 A * | 8/1988 | Belmares-Sarabia et al. ..... | 348/650 |
| 6,937,370 B1 * | 8/2005 | Nitta et al. ................... | 358/518 |
| 2001/0033288 A1 * | 10/2001 | Nabeshima ................. | 345/601 |
| 2002/0021360 A1 * | 2/2002 | Takemoto .................. | 348/222 |
| 2003/0065807 A1 * | 4/2003 | Satomi et al. ............... | 709/231 |
| 2003/0156206 A1 | 8/2003 | Ikeda et al. | |
| 2004/0036898 A1 | 2/2004 | Takahashi | |

FOREIGN PATENT DOCUMENTS

| | | |
|---|---|---|
| CN | 1487737 | 4/2004 |
| JP | 07-320024 | 12/1995 |
| JP | 2003-244723 | 8/2003 |
| JP | 2003-299115 | 10/2003 |
| JP | 2004-129226 | 4/2004 |
| JP | 2004-166313 | 6/2004 |

OTHER PUBLICATIONS

Chinese Office Action issued Nov. 16, 2007 in Application No. 2006101402731.

* cited by examiner

*Primary Examiner*—Yogesh K Aggarwal
(74) *Attorney, Agent, or Firm*—Fitzpatrick, Cella, Harper & Scinto

(57) ABSTRACT

In an image sensing apparatus, the color value of a conversion destination is acquired from a code image included in the image data captured by an image sensing unit. A frame is displayed on an electronic viewfinder screen, which is displayed based on the image data output from an image processing unit in the image sensing apparatus. The color value of a conversion target is determined based on color information included in the frame of an image displayed on the electronic viewfinder screen in response to a predetermined operation input. Color conversion parameters of the image processing unit are determined so as to convert colors within a predetermined range including the color value of the conversion target into colors within a predetermined range including the color value of the conversion destination on a color space.

16 Claims, 21 Drawing Sheets

FIG. 5

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

BAYER MATRIX CCD SIGNAL

FIG. 6

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| G1 | G1 | G1 | G1 | G1 | G1 |
|----|----|----|----|----|----|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

| G2 | G2 | G2 | G2 | G2 | G2 |
|----|----|----|----|----|----|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

BAYER INTERPOLATED SIGNAL

FIG. 7

| 1 / 16 | 2 / 16 | 1 / 16 |
|---|---|---|
| 2 / 16 | 4 / 16 | 2 / 16 |
| 1 / 16 | 2 / 16 | 1 / 16 |

IMAGE SENSING APPARATUS AND CONTROL METHOD THEREOF

BACKGROUND OF THE INVENTION

1. Field of the Invention

The present invention relates to an image sensing apparatus and control method thereof, which allow user's customization of colors.

2. Description of the Related Art

In recent years, digital cameras have become popular, and many users increasingly have the opportunity of using digital cameras. For this reason, the users' needs for digital cameras have expanded. An example of such needs is good color reproducibility. The color reproducibility characteristics as a goal of each vendor aim at an average color reproduction that most users prefer. However, since users have different taste, it is impossible to realize color reproducibility which meets the needs of all users.

To solve this problem, a digital camera which allows the user to customize parameters such as hue, saturation, brightness, and the like to realize color reproducibility of the user's choice upon recording is available. However, since it is difficult to present the relationship between changes in parameters and those in colors to the user, optimal settings require a user's skill.

As proposals associated with a method of allowing the user to adjust colors with ease, Japanese Patent Laid-Open Nos. 2004-129226 and 07-320024 are known. Japanese Patent Laid-Open No. 2004-129226 describes a configuration that executes color conversion processing for converting a designated source color into a designated destination color by designating a desired source color in an image during retouch processing of an image, and designating a desired color as a conversion destination color. Also, Japanese Patent Laid-Open No. 07-320024 describes a configuration which designates an arbitrary extraction color (source color) by moving a cursor on a displayed image using a joystick. On the other hand, Japanese Patent Laid-Open No. 2003-299115 describes a configuration that captures skin color as a source color to be changed using an image sensing apparatus, and calculates color conversion coefficients based on the captured skin color and skin color reproduction destination value stored in a ROM. Moreover, Japanese Patent Laid-Open No. 2004-166313 discloses a configuration which converts the color of a region set in a target image such as the lip region or the like using color information acquired from a coloring product by RFID (Radio Frequency Identification).

However, Japanese Patent Laid-Open No. 2004-129226 pertains to the retouch processing of an image, but it does not set color conversion processing upon recording in the image sensing apparatus. Also, this method is not suitable for color conversion processing on a limited user interface like that of the image sensing apparatus, because that method requires the user to designate the source color and destination color using a cursor. The method of Japanese Patent Laid-Open No. 07-320024 designates a desired color by moving a cursor on an image. However, this method requires an operation unit for cursor movement, and is not suitable for a digital camera or the like which requires portability. Furthermore, in Japanese Patent Laid-Open No. 2003-299115, the user selects a desired destination color from several types of destination colors pre-stored in the ROM. That is, the destination colors are limited to several types, and free color conversion cannot be realized. Also, as each destination color is not presented to the user as an image, it is difficult for the user to recognize a conversion destination color. Furthermore, Japanese Patent Laid-Open No. 2004-166313 specifies a color conversion region in the target image based on region identification information acquired from the coloring product (e.g., a lip rouge), and converts the color of the color conversion region using color information acquired from outside the coloring product. Therefore, the region to be converted cannot be flexibly set.

SUMMARY OF THE INVENTION

The present invention has been made in consideration of the above situation, and has as its object to allow the user to easily and flexibly set the conversion source color and conversion target color even on a limited user interface of an image sensing apparatus, and to implement desired color conversion upon recording by a simple operation.

According to one aspect of the present invention, there is provided an image sensing apparatus which comprises an image sensing unit, an image processing unit adapted to process image data obtained by the image sensing unit, and a recording unit adapted to record the image data output from the image processing unit. The apparatus also comprises an acquisition unit adapted to acquire a color value of a conversion destination from a code image included in the image data captured by the image sensing unit; a display unit adapted to display the image data output from the image processing unit and a frame on a screen; a determination unit adapted to determine a color value of a conversion target based on color information included in the frame of image data displayed on the screen in response to a predetermined operation; and a setting unit adapted to set color conversion parameters of the image processing unit so as to convert colors within a predetermined range including the color value of the conversion target into colors within a predetermined range including the color value of the conversion destination on a color space.

Also, according to another aspect of the present invention, there is provided an image sensing apparatus which comprises an image sensing unit, an image processing unit adapted to process image data obtained by the image sensing unit, and a recording unit adapted to record the image data output from the image processing unit. The apparatus also comprises a determination unit adapted to determine a color value of a conversion target based on color information included in a predetermined area of a desired already captured image; a display unit adapted to display the image data output from the image processing unit on a screen; an acquisition unit adapted to acquire a color value of a conversion destination from a code image included in the image data displayed on the screen; a setting unit adapted to set color conversion parameters of the image processing unit so as to convert colors within a predetermined range including the color value of the conversion target into colors within a predetermined range including the color value of the conversion destination on a color space; and a conversion unit adapted to execute color conversion processing for the desired already captured image using the color conversion parameters set by the setting unit.

Furthermore, according to another aspect of the present invention, there is provided a method of controlling an image sensing apparatus which comprises an image sensing unit, a control unit adapted to execute image processing of image data obtained by the image sensing unit, and a recording unit adapted to record the image data obtained from the image processing. The method comprises an acquisition step of acquiring a color value of a conversion destination from a code image included in the image data captured by the image sensing unit; a display step of displaying the image data obtained from the image processing and a frame on a screen;

a determination step of determining a color value of a conversion target based on color information included in the frame of the image data displayed on the screen in response to a predetermined operation; and a setting step of setting color conversion parameters of the image processing so as to convert colors within a predetermined range including the color value of the conversion target into colors within a predetermined range including the color value of the conversion destination on a color space.

Furthermore, according to another aspect of the present invention, there is provided a method of controlling an image sensing apparatus which comprises an image sensing unit, a control unit for executing image processing of image data obtained by the image sensing unit, and a recording unit for recording the image data obtained from the image processing. The method comprises a determination step of determining a color value of a conversion target based on color information included in a predetermined area of a desired already captured image; a display step of displaying the image data obtained from the image processing on a screen; an acquisition step of acquiring a color value of the conversion destination from a code image included in the image data displayed on the screen; a setting step of setting color conversion parameters of the image processing so as to convert colors within a predetermined range including the color value of the conversion target into colors within a predetermined range including the color value of the conversion destination on a color space; and a conversion step of executing color conversion processing for the desired already captured image using the color conversion parameters set in the setting step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a conceptual view for explaining a color matrix of a CCD in the image sensing apparatus according to the embodiment of the present invention;

FIG. 6 is a conceptual view for explaining data after interpolation of CCD signals in the image sensing apparatus according to the embodiment of the present invention;

FIG. 7 is a view for explaining a filter used in brightness signal generation processing according to the embodiment of the present invention;

DESCRIPTION OF THE EMBODIMENTS

Preferred embodiments of the present invention will now be described in detail in accordance with the accompanying drawings.

First Embodiment

Figure 1:
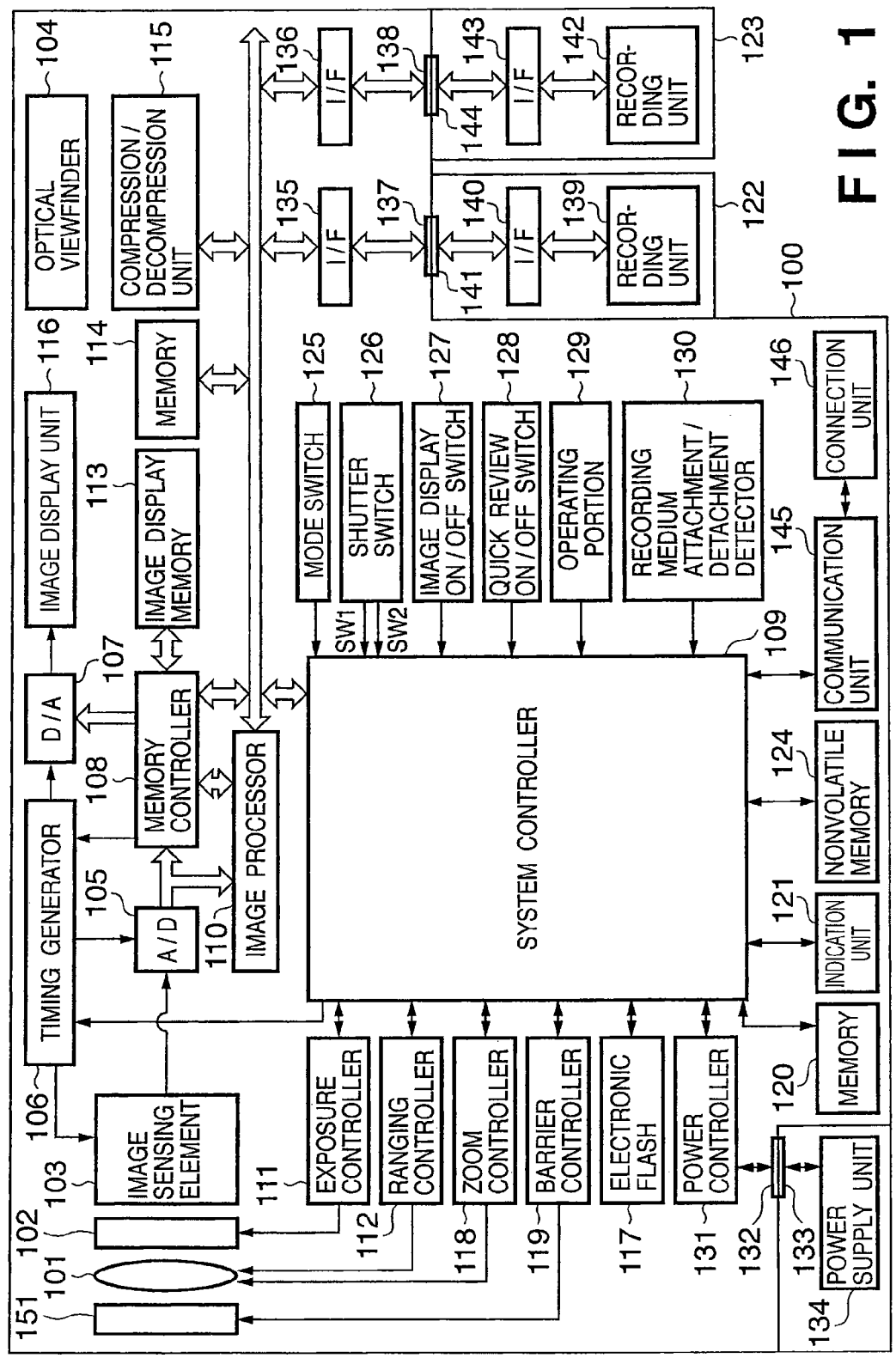
FIG. 1 is a block diagram showing the arrangement of an image sensing apparatus according to an embodiment of the present invention.

FIG. 1 is a block diagram showing an example of the arrangement of an image sensing apparatus 100 (a digital camera in this example) according to this embodiment. An optical image on a physical space is formed on an image sensing element 103 that converts the optical image into an electrical signal via a photographing lens 101 and a shutter 102 with an aperture function. An A/D converter 105 converts an analog signal output from the image sensing element 103 into a digital signal. A memory controller 108 and system controller 109 control a timing generator 106, which supplies clock signals and a control signal to the image sensing element 103, the A/D converter 105, and a D/A converter 107.

An image processor 110 applies predetermined pixel interpolation processing and color conversion processing to data from the A/D converter 105 or the memory controller 108. The image processor 110 executes a predetermined arithmetic operation processing using captured image data. The system controller 109 controls an exposure controller 111 and a ranging controller 112 based on the arithmetic operation result of the image processor 110 to execute TTL (through-the-lens) AF (auto-focus) processing, AE (auto-exposure) processing, and EF (flash pre-emission) processing. Furthermore, the image processor 110 executes predetermined arithmetic operation processing using captured image data to also execute TTL AWB (auto white balance) processing based on the obtained arithmetic operation result.

The memory controller 108 controls the A/D converter 105, the timing generator 106, the D/A converter 107, the image processor 110, an image display memory 113, a memory 114, and a compression/decompression unit 115. Data output from the A/D converter 105 is written in the image display memory 113 or the memory 114 via the image processor 110 and the memory controller 108 or via only the memory controller 108. Note that image data is written in the image display memory 113 while being decimated in correspondence with the resolution of a display of an image display unit 116. The D/A converter 107 converts the image data for display written in the image display memory 113 into an analog signal for image display, which is displayed by the image display unit 116. The image display unit 116 comprises a TFT LCD or the like. When the image display unit 116 displays captured image data sequentially, it can implement a so-called electronic viewfinder function. The image display unit 116 can arbitrarily turn on/off its display in accordance with an instruction from the system controller 109. When display is OFF, the power consumption of the image sensing apparatus 100 can be greatly reduced.

The memory 114 is used to store captured still image data and moving image data. The memory 114 has a storage capacity large enough to store a predetermined number of still images or a moving image for a predetermined period of time. As a result, in case of continuous-shot photographing or panorama photographing that continuously captures a plurality of still images, write access of a large number of images can be made on the memory 114 at high speed. In addition, the memory 114 can be used as a work area of the system controller 109.

The compression/decompression unit 115 compresses/decompresses image data by adaptive discrete cosine transformation (ADCT) or the like. The compression/decompression unit 115 executes compression or decompression processing by loading an image stored in the memory 114, and writes the processed data in the memory 114.

The exposure controller 111 controls the shutter 102 with an aperture function, and also has a flash light control function in collaboration with an electronic flash 117. The ranging controller 112 controls focusing of the photographing lens 101. A zoom controller 118 controls zooming of the photographing lens 101. A barrier controller 119 controls the operation of a protection unit 151. The protection unit 151 serves as a barrier which covers an image sensing unit including the photographing lens 101, the shutter 102, and the image sensing element 103 of the image sensing apparatus 100 to protect the image sensing part from contamination and damage. In general, the protection unit 151 has as its principal object to protect the lens 101. The electronic flash 117 has a light projection function of AF auxiliary light, and the flash light control function. The exposure controller 111 and the ranging controller 112 are controlled using the TTL system. That is, the system controller 109 controls the exposure controller 111 and the ranging controller 112 based on the arithmetic result of captured image data by the image processor 110. The system controller 109 controls the entire image sensing apparatus 100. A memory 120 stores constants, variables, programs, and the like required to operate the system controller 109.

An indication unit 121 includes a liquid crystal display device (LCD), LEDs, and the like which present the operation states, messages, and the like by means of text, icons, and the like in accordance with execution of programs by the system controller 109. Note that the indication unit 121 may also include a loudspeaker, a piezoelectric buzzer (sound generation element), or the like which can output a sound, buzzer tone, or the like used to present some of the operation states, messages, and the like. The indication unit 121 may be set at one or a plurality of easy-to-see positions around an operating portion of the image sensing apparatus 100. Some functions of the indication unit 121 are set within an optical viewfinder 104.

Of the indication contents of the indication unit 121, those displayed on the LCD or the like include, e.g., a single/continuous shot photographing indication, a self timer indication, a compression ratio indication, a recording pixel count indication, a recorded image count indication, a remaining recordable image count indication, a shutter speed indication, an aperture value indication, an exposure correction indication, a flash indication, a red-eye suppression indication, a macro photographing indication, a buzzer setting indication, a remaining timepiece battery level indication, a remaining battery level indication, an error indication, information indication using numerals of a plurality of digits, an attachment/detachment indication of recording media 122 and 123, a communication I/F operation indication, a date/time indication, and the like. Of the indication contents of the indication unit 121, those displayed within the optical viewfinder 104 include, e.g., an in-focus indication, a camera shake alert indication, a flash charging indication, a shutter speed indication, an aperture value indication, an exposure correction indication, and the like.

A nonvolatile memory 124 is an electrically erasable/recordable memory, and uses, e.g., an EEPROM or the like. A mode switch 125, a shutter switch 126, an image display ON/OFF switch 127, a quick review ON/OFF switch 128, and an operating portion 129 form user interface components used to input various operation inputs to the system controller 109. These user interface components are constructed by one or a plurality of combinations of a switch, a dial, a touch panel, a pointer using line of sight detection, a voice recognition device, and the like. These user interface components will be described in detail below.

The mode switch 125 is used to switch and set one of respective function modes: an automatic photographing mode, a photographing mode, a panorama photographing mode, a play mode, multi-frame playback/erasure mode, a PC connection mode, and the like. The mode switch 125 may include a function of switching of power on/off. The shutter switch 126 outputs a signal SW1 in response to a pressing operation of a shutter button (release button) (203 in FIG. 2) (half-stroke pressing of the shutter button), and outputs a signal SW2 upon completion of operation of the shutter button (full-stroke pressing of the shutter button). The signal SW1 instructs the apparatus to start the operations such as AF (auto-focus) processing, AE (auto exposure) processing, AWB (auto white balance) processing, EF (flash pre-emission) processing, and the like. The signal SW2 instructs the apparatus to start the operations of a series of photographing processes. In the photographing processes, the A/D converter 105 converts a signal read out from the image sensing element 103 into digital data (exposure processing). The A/D converter 105 outputs and writes the converted digital data in the memory 114 as image data (RAW data) via the memory controller 108. The image processor 110 performs arithmetic operation processing (development processing) of the exposure-processed signal, and the memory controller 108 writes the image data as the processing result in the memory 114. The compression/decompression unit 115 reads out the image data from the memory 114, compresses the readout image data, and writes the compressed image data in the recording medium 122 or 123 (recording processing).

The image display ON/OFF switch 127 is used to set ON/OFF of the image display unit 116. This function can cut off power supply to the image display unit 116 comprising a TFT LCD and the like upon photographing using the optical viewfinder 104, so as to attain power savings. The quick review ON/OFF switch 128 is used to set ON/OFF of a quick review function of automatically playing back captured image data immediately after photographing. Note that a function of setting the quick review function when the image display unit 116 is OFF is equipped (the user can review a captured image even when image display is OFF).

The operating portion 129 includes various buttons, a touch panel, and the like, and functions as various operation instruction buttons as one switch or combinations of a plurality of switches. Such operation instruction buttons include, for example, a menu button, a SET button, a macro button, a multi-frame playback new page button, a flash setting button, a single-shot/continuous-shot/self-timer select button, a menu upward move button, a menu downward move button, playback image next move button, a playback image back move button, a captured image quality select button, an exposure correction button, a date/time setting button, an image delete button, an image delete cancel button, and the like.

A power supply controller 131 comprises a battery detection circuit, a DC-DC converter, a switch circuit for switching blocks to be energized, and the like. The power supply controller 131 detects the presence/absence of attachment, the type, and the remaining battery level of a battery, controls the DC-DC converter based on such detection results and an instruction from the system controller 109, and supplies required voltages to the respective units including the recording media for required periods of time. A power supply unit 134 includes a primary battery such as an alkali battery, a lithium battery, or the like, a secondary battery such as an NiCd battery, an NiMH battery, an Li battery, or the like, an AC adapter, and the like. The power supply unit 134 is connected to the power supply controller 131 via connectors 132 and 133.

Interfaces 135 and 136 connect recording media such as a memory card, a hard disk, and the like to the bus in the image sensing apparatus 100. The connections between the recording media such as a memory card, hard disk, and the like and the interfaces 135 and 136 are attained via connectors 137 and 138. A recording medium attachment/detachment detector 130 detects whether or not the recording medium 122 and/or the recording medium 123 are/is attached to the connector 137 and/or the connector 138.

Note that this embodiment has two sets of interfaces and connectors that receive the recording media. However, the number of sets of interfaces and connectors that receive the recording media is not particularly limited, i.e., one or a plurality of sets of them may be equipped. Also, combinations of interfaces and connectors of different standards may be used. As the interface and connector, those compatible to the standards of a PCMCIA card, CF (Compact Flash®) card, and the like may be used.

Furthermore, when the interfaces 135 and 136, and the connectors 137 and 138 adopt those compatible to the standards of a PCMCIA card, a CF (Compact Flash®) card, and the like, they can connect various communication cards. Such communication cards include a LAN card, a modem card, a USB card, an IEEE1394 card, a P1284 card, a SCSI card, a PHS, and the like. By connecting these communication cards, the image sensing apparatus 100 can communicate and exchange image data and associated management information with another computer or peripheral devices such as a printer and the like.

The optical viewfinder 104 alone can be used to allow photographing without using the electronic viewfinder function implemented by the image display unit 116. The optical viewfinder 104 includes some functions of the indication unit 121, e.g., an in-focus indication, a camera shake alert indication, a flash charging indication, a shutter speed indication, an aperture value indication, an exposure correction indication, and the like, as described above.

A communication unit 145 has various communication functions such as RS232C, USB, IEEE1394, P1284, SCSI, modem, LAN, wireless communication, and the like. A connection unit 146 is a connector used to connect the image sensing apparatus 100 and another apparatus using the communication unit 145. Alternatively, in case of a wireless communication, the connection unit 146 is an antenna.

The recording media 122 and 123 comprise recording units 139 and 142 such as a semiconductor memory, a magnetic disk, and the like, interfaces 140 and 143 with the image sensing apparatus 100, and connectors 141 and 144 used to connect the image sensing apparatus 100.

Figure 2:
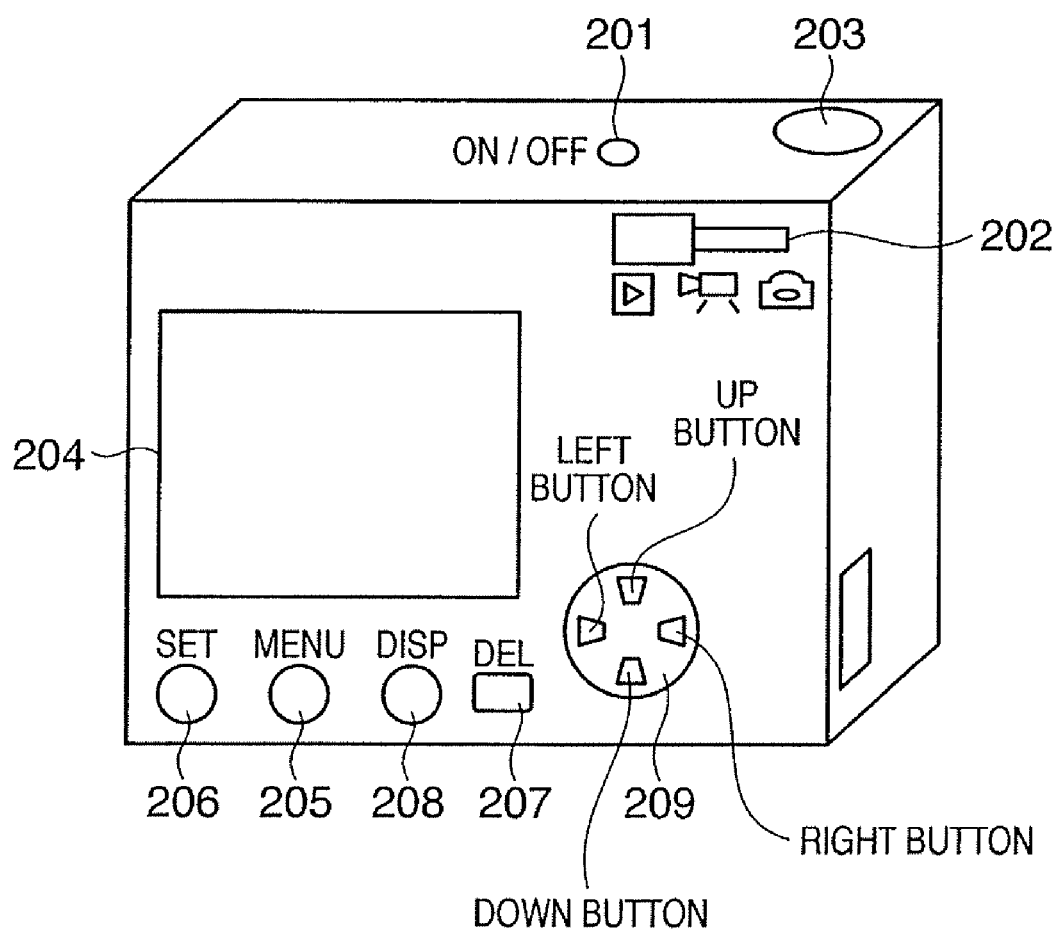
FIG. 2 shows the outer appearance of the image sensing apparatus according to the embodiment of the present invention.

FIG. 2 is a perspective view of the image sensing apparatus 100 (digital camera). Reference numerals 201, 205 to 207, and 209 denote some components which form the aforementioned operating portion 129. A power switch 201 is a button used to turn on/off the power supply. A mode change lever 202 serves as the mode switch 125, and is used to switch and set respective function modes such as a photographing mode, a play mode, a moving image capture mode, a still image photographing mode, and the like. A shutter button 203 serves as the aforementioned shutter switch 126. An LCD 204 forms a display of the image display unit 116 to serve as an electronic viewfinder, and displays a screen obtained by playing back a still image and/or moving image. A menu button 205 is a switch used to turn on/off a menu screen used to change photographing parameters and camera settings. A SET button 206 is used in selection, determination, and the like on the menu screen displayed upon operation of the menu button 205. A delete button 207 is used to designate deletion of an image. A display button 208 forms the aforementioned image display ON/OFF switch 127, and is used to switch ON/OFF of display on the LCD 204. A cross button 209 can be used to shift items on the menu screen using its up, down, right, and left buttons, and to shift images by pressing its right or left button in the play mode.

Figure 3:
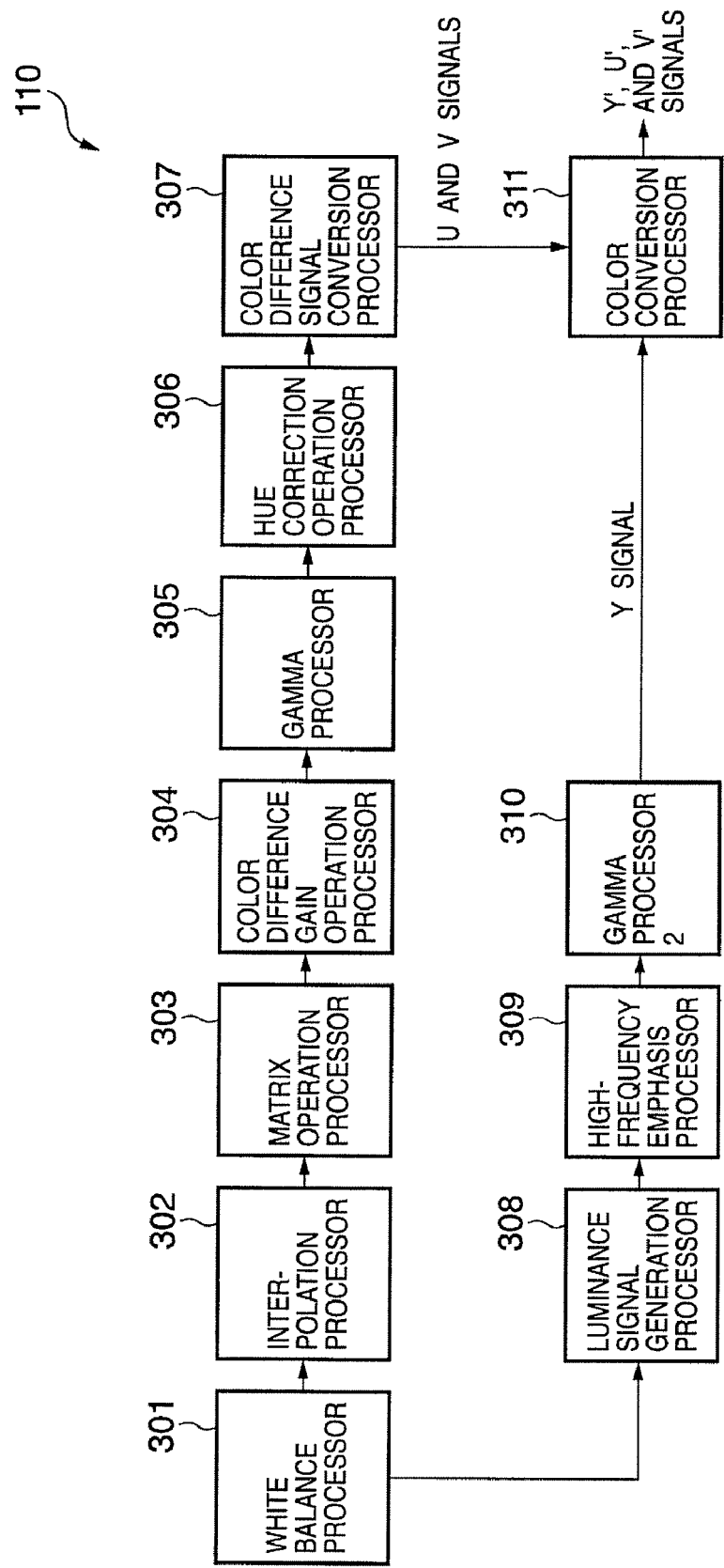
FIG. 3 is a diagram for explaining image processing according to the embodiment of the present invention.

FIG. 3 is a block diagram for explaining the processing in the image processor 110 in the image sensing apparatus 100 according to this embodiment. Note that the memory 120 stores parameter values used in respective processes to be described below (parameters for a matrix operation and those of a 3D lookup table), and the system controller 109 reads out these parameters and sets them in the image processor 110 as needed. A white balance processor 301 applies white balance processing to CCD digital signal, which is A/D-converted by the A/D converter 105. A description of the white balance processing will be omitted here, but the processing can be implemented using a method described in, e.g., Japanese Patent Laid-Open No. 2003-244723. The CCD digital signal that has undergone the white balance processing is supplied to an interpolation processor 302. Assume that the image sensing element 103 of this embodiment has a color filter of a Bayer matrix, as shown in FIG. 5. Therefore, the interpolation processor 302 executes processing for converting CCD Bayer matrix data shown in FIG. 5 into interpolated data R, G1, G2, and B shown in FIG. 6. The interpolated CCD digital signal is input to a matrix operation processor 303, and undergoes a 4×3 matrix operation given by:

$$\begin{vmatrix} Rm \\ Gm \\ Bm \end{vmatrix} = \begin{vmatrix} M11 & M21 & M31 & M41 \\ M12 & M22 & M32 & M42 \\ M13 & M23 & M33 & M43 \end{vmatrix} \begin{vmatrix} R \\ G1 \\ G2 \\ B \end{vmatrix} \quad (1)$$

to obtain Rm, Gm, and Bm.

The CCD digital signal that has undergone the matrix operation processing is input to a color difference gain operation processor 304, which multiplies color difference signals by gains. That is, the Rm, Gm, and Bm signals are converted into Y, Cr, and Cb signals by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rm \\ Gm \\ Bm \end{vmatrix} \quad (2)$$

Then, the obtained Cr and Cb signals are multiplied by a gain according to:

$$Cr' = G1 \times Cr$$

$$Cb' = G1 \times Cb \quad (3)$$

After that, these signals are converted into Rg, Gg, and Bg signals by an inverse matrix operation of formula (2), i.e., by:

$$\begin{vmatrix} Rg \\ Gg \\ Bg \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (4)$$

The CCD digital signal that has undergone the color difference gain operation processing is sent to a gamma processor 305. The gamma processor 305 performs gamma conversion of the CCD digital signal using:

$$Rt = GammaTable[Rg] \quad (5)$$

$$Gt = GammaTable[Gg] \quad (6)$$

$$Bt = GammaTable[Bg] \quad (7)$$

where GammaTable is a one-dimensional (1D) lookup table.

The CCD digital signal that has undergone the gamma processing is sent to a hue correction operation processor 306. The hue correction operation processor 306 converts the Rt, Gt, and Bt signals into Y, Cr, and Cb signals by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rt \\ Gt \\ Bt \end{vmatrix} \quad (8)$$

Furthermore, the hue correction operation processor 306 corrects the Cr and Cb signals by:

$$\begin{vmatrix} Cr' \\ Cb' \end{vmatrix} = \begin{vmatrix} H11 & H21 \\ H12 & H22 \end{vmatrix} \begin{vmatrix} Cr \\ Cb \end{vmatrix} \quad (9)$$

After that, the hue correction operation processor 306 converts these signals into Rh, Gh, and Bh signals by an inverse matrix operation of formula (8), i.e., by:

$$\begin{vmatrix} Rh \\ Gh \\ Bh \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (10)$$

The CCD digital signal which has been processed by the hue correction operation processor 306 is sent to a color difference signal conversion processor 307. The color difference signal conversion processor 307 generates U and V signals from the Rh, Gh, and Bh signals using:

$$\begin{vmatrix} U \\ V \end{vmatrix} = \begin{vmatrix} -0.169 & -0.333 & 0.502 \\ 0.499 & -0.421 & -0.078 \end{vmatrix} \begin{vmatrix} Rh \\ Gh \\ Bh \end{vmatrix} \quad (11)$$

Figure 7:
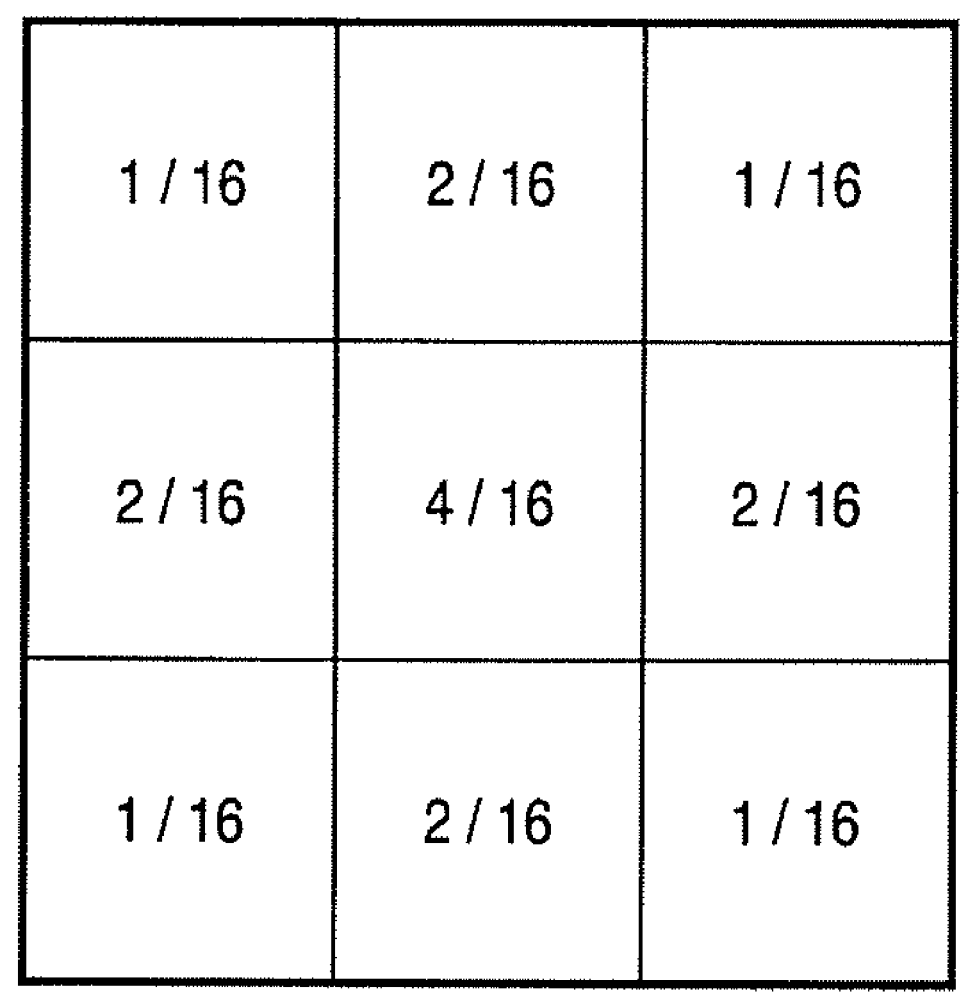

On the other hand, the CCD digital signal that has undergone the white balance processing by the white balance processor 301 is also supplied to a luminance signal generation processor 308. The luminance signal generation processor 308 converts the CCD digital signal into a luminance signal. For example, a luminance signal in case of a primary color filter shown in FIG. 5 is obtained by setting all R and B signal components to zero, and applying two-dimensional (2D) filter processing with coefficients shown in FIG. 7. Note that a luminance signal in case of a complementary color filter is obtained by directly applying the 2D filter processing with coefficients shown in FIG. 7. A high-frequency emphasis processor 309 applies edge emphasis processing to the luminance signal generated by the luminance signal generation processor 308, and a gamma processor 310 also applies gamma conversion processing to that signal to generate a Y signal.

A color conversion processor 311 converts the Y signal output from the gamma processor 310 and the U and V signals output from the color difference signal conversion processor 307 into Y', U', and V' signals. The color conversion processor 311 executes conversion processing using a 3D lookup table. Details of this processing will be described later.

The digital camera (image sensing apparatus 100) of this embodiment has a color conversion mode, as one of modes for photographing, in which an arbitrary color designated by the user is converted into another arbitrary color designated by the user. In order to set the operation mode of the image sensing apparatus 100 in the color conversion mode, the user can select the color conversion mode using the mode change lever 202. In this color conversion mode, the LCD 204 displays an electronic viewfinder (EVF) screen 801 shown in FIG. 8A or 8B to allow the user to make a predetermined operation, so that a desired color falls within a color capture frame 802 in a captured image which is displayed in real time. With this predetermined operation, the color of the image within the color capture frame 802 is determined as a conversion source color. Also, by making a predetermined operation while a predetermined code image falls within the color capture frame 802, the system controller 109 analyzes the code image to determine a conversion destination color. After the conversion source color and the conversion destination colors are determined, a lookup table of the color conversion processor 311 is set so as to convert the determined conversion source color into the conversion destination color. As a result, an image displayed on the EVF screen 801 and a captured image recorded upon operation of the shutter button 203 become those in which the conversion source color is converted into the conversion destination color. The color conversion mode of this embodiment will be described in detail below.

Figure 9:
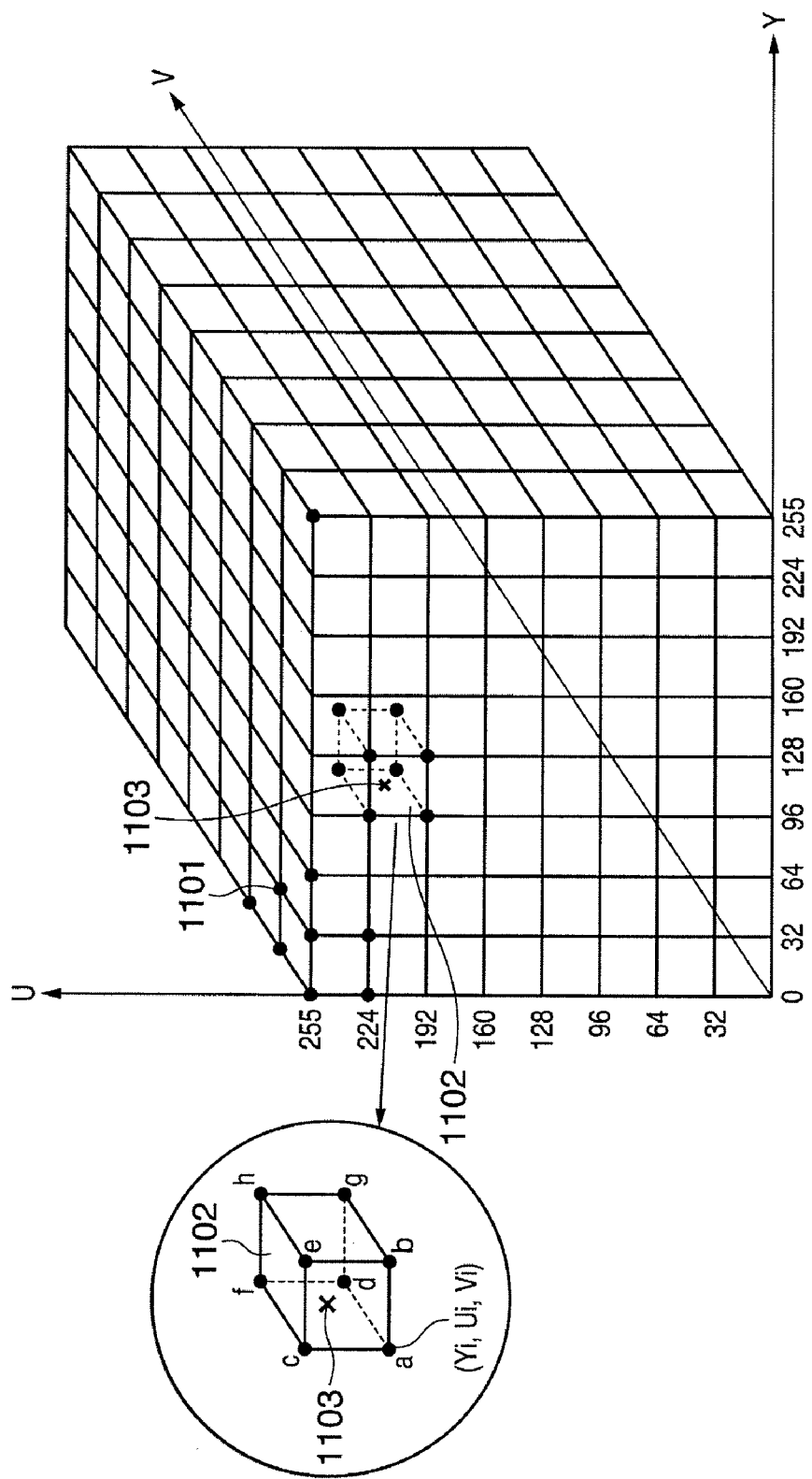
FIG. 9 is a view for explaining color conversion processing by a three-dimensional (3D) lookup table.

The color conversion processing from the conversion source color into the conversion destination color in the color conversion mode will be described first. The color conversion processor 311 converts Y, U, and V signals into Y', U', and V' signals by the 3D lookup table. In order to reduce the 3D lookup table size, this embodiment prepares a list (lookup table) of Y, U, and V values of 729 (=9×9×9) 3D representative grid points obtained by dividing ranges from a minimum value to a maximum value of Y, U, and V signals into 8. Note that Y, U, and V signals other than those at the representative grid points are calculated by interpolation. FIG. 9 conceptually shows a 3D lookup table of this embodiment. At each grid point, converted Y, U, and V values are set. For example, a grid point 1101 is a point of (32, 255, 32), and the values (32, 255, 32) are assigned to the grid point 1101 if the values before and after conversion remain unchanged. On the other hand, if the grid point 1101 assumes values (32, 230, 28) after conversion, these values are set at the grid point 1101.

For example, Y, U, and V values at a point 1103 in a cubic grid 1102 in FIG. 9 are calculated by interpolation operations from Y, U, and V values at respective grid points a to h corresponding to the vertices of the cubic grid 1102. The interpolation operations are implemented by:

$$Y = Yi + Yf$$

$$U = Ui + Uf$$

$$V = Vi + Vf$$

$$\begin{aligned}
Yout(Y, U, V) &= Yout(Yi+Yf, Ui+Uf, Vi+Vf) \quad (12) \\
&= (Yout(Yi, Ui, Vi) \times (\text{Step} - Yf) \times \\
&\quad (\text{Step} - Uf) \times (\text{Step} - Vf) + \\
&\quad Yout(Yi + \text{Step}, Ui, Vi) \times (Yf) \times \\
&\quad (\text{Step} - Uf) \times (\text{Step} - Vf) + \\
&\quad Yout(Yi, Ui + \text{Step}, Vi) \times (\text{Step} - Yf) \times (Uf) \times \\
&\quad (\text{Step} - Vf) + Yout(Yi, Ui, Vi + \text{Step}) \times \\
&\quad (\text{Step} - Yf) \times (\text{Step} - Uf) \times (Vf) + \\
&\quad Yout(Yi + \text{Step}, Ui + \text{Step}, Vi) \times (Yf) \times (Uf) \times \\
&\quad (\text{Step} - Vf) + Yout(Yi + \text{Step}, Ui, Vi + \text{Step}) \times \\
&\quad (Yf) \times (\text{Step} - Uf) \times (Vf) + \\
&\quad Yout(Yi, Ui + \text{Step}, Vi + \text{Step}) \times (\text{Step} - Yf) \times \\
&\quad (Uf) \times (Vf) + \\
&\quad Yout(Yi + \text{Step}, Ui + \text{Step}, Vi + \text{Step}) \times \\
&\quad (Yf) \times (Uf) \times (Vf)) / (\text{Step} \times \text{Step} \times \text{Step})
\end{aligned}$$

$$\begin{aligned}
Uout(Y, U, V) &= Uout(Yi+Yf, Ui+Uf, Vi+Vf) \quad (13) \\
&= (Uout(Yi, Ui, Vi) \times (\text{Step} - Yf) \times \\
&\quad (\text{Step} - Uf) \times (\text{Step} - Vf) + \\
&\quad Uout(Yi + \text{Step}, Ui, Vi) \times (Yf) \times \\
&\quad (\text{Step} - Uf) \times (\text{Step} - Vf) + \\
&\quad Uout(Yi, Ui + \text{Step}, Vi) \times (\text{Step} - Yf) \times (Uf) \times \\
&\quad (\text{Step} - Vf) + Uout(Yi, Ui, Vi + \text{Step}) \times \\
&\quad (\text{Step} - Yf) \times (\text{Step} - Uf) \times (Vf) + \\
&\quad Uout(Yi + \text{Step}, Ui + \text{Step}, Vi) \times (Yf) \times (Uf) \times \\
&\quad (\text{Step} - Vf) + Uout(Yi + \text{Step}, Ui, Vi + \text{Step}) \times \\
&\quad (Yf) \times (\text{Step} - Uf) \times (Vf) + \\
&\quad Uout(Yi, Ui + \text{Step}, Vi + \text{Step}) \times (\text{Step} - Yf) \times \\
&\quad (Uf) \times (Vf) + \\
&\quad Uout(Yi + \text{Step}, Ui + \text{Step}, Vi + \text{Step}) \times \\
&\quad (Yf) \times (Uf) \times (Vf)) / (\text{Step} \times \text{Step} \times \text{Step})
\end{aligned}$$

$$\begin{aligned}
Vout(Y, U, V) &= Vout(Yi+Yf, Ui+Uf, Vi+Vf) \quad (14) \\
&= (Vout(Yi, Ui, Vi) \times (\text{Step} - Yf) \times \\
&\quad (\text{Step} - Uf) \times (\text{Step} - Vf) + \\
&\quad Vout(Yi + \text{Step}, Ui, Vi) \times (Yf) \times \\
&\quad (\text{Step} - Uf) \times (\text{Step} - Vf) + \\
&\quad Vout(Yi, Ui + \text{Step}, Vi) \times (\text{Step} - Yf) \times (Uf) \times \\
&\quad (\text{Step} - Vf) + Vout(Yi, Ui, Vi + \text{Step}) \times \\
&\quad (\text{Step} - Yf) \times (\text{Step} - Uf) \times (Vf) + \\
&\quad Vout(Yi + \text{Step}, Ui + \text{Step}, Vi) \times (Yf) \times (Uf) \times \\
&\quad (\text{Step} - Vf) + Vout(Yi + \text{Step}, Ui, Vi + \text{Step}) \times \\
&\quad (Yf) \times (\text{Step} - Uf) \times (Vf) + \\
&\quad Vout(Yi, Ui + \text{Step}, Vi + \text{Step}) \times (\text{Step} - Yf) \times \\
&\quad (Uf) \times (Vf) + \\
&\quad Vout(Yi + \text{Step}, Ui + \text{Step}, Vi + \text{Step}) \times \\
&\quad (Yf) \times (Uf) \times (Vf)) / (\text{Step} \times \text{Step} \times \text{Step})
\end{aligned}$$

where Y, U, and V are the input Y, U, and V signals, and Yout(Y, U, V), Uout(Y, U, V), and Vout(Y, U, V) are the output Y, U, and V signals at that time. Also, Yi, Ui, and Vi are signals at a representative grid point (a in FIG. 9) whose values are smaller than Y, U, and V signal values of the input Y, U, and V signals, and are closest to these signal values. Furthermore, Yout(Yi, Ui, Vi), Uout(Yi, Ui, Vi), and Vout(Yi, Ui, Vi) are representative grid point output signals, and Step (=32 in this embodiment) is the step width of representative grid points. Therefore, for example, signals at a grid point b are expressed by Yi+Step, Ui, and Vi, and signals at a grid point c are expressed by Yi, Ui+Step, and Vi.

In the following description, the lookup table conversion and interpolation operation formulas given by formulas (12), (13), and (14) are simply expressed by:

$$(Yout, Uout, Vout) = LUT[(Y,U,V)] \quad (15)$$

where Y, U, and V are input signal values, LUT is the 9×9×9 lookup table shown in FIG. 9, and Yout, Uout, and Vout are the results (Y', U', and V' in FIG. 3) of the lookup table conversion and interpolation operations. That is, the color conversion processor 311 executes the conversion processing given by formula (15) above.

As described above, after the conversion source color and the conversion destination color are determined in the color conversion mode, a cubic grid which includes the conversion source color is determined, and the values of respective grid points which form the cubic grid are changed to have the conversion destination color at the coordinate position of the conversion source color. For example, if the conversion source color determined in FIG. 9 has Y, U, and V values at a grid point 1103, the values of grid points a to h of the cubic grid 1102 are changed so that the Y, U, and V values at the point 1103 become those of the set conversion destination color upon execution of the interpolation processing described by formula (15). Although a detailed description of this processing will be omitted, the values of representative grid points after the change are mathematically calculated. The color conversion processor 311 executes the color conversion processing using the 3D lookup table after the change. In the following description, such changes in value of the grid points will be referred to as parameter settings.

As described above, since color conversion is done by determining grid point data of the 3D lookup table based on the designated conversion source color and the conversion destination color, a color setting of user's choice can be easily imparted to an image to be played back. In the above color conversion processing, only representative grid points near the color to be changed are changed. For this reason, only some colors can be easily and quickly converted into those of user's choice. That is, since no parameters which are used in the matrix operation processor 303, the color difference signal gain operation processor 304, the gamma processor 305, the hue correction operation processor 306, and the like are changed, only a desired color (color region) can be changed.

Figure 4A:
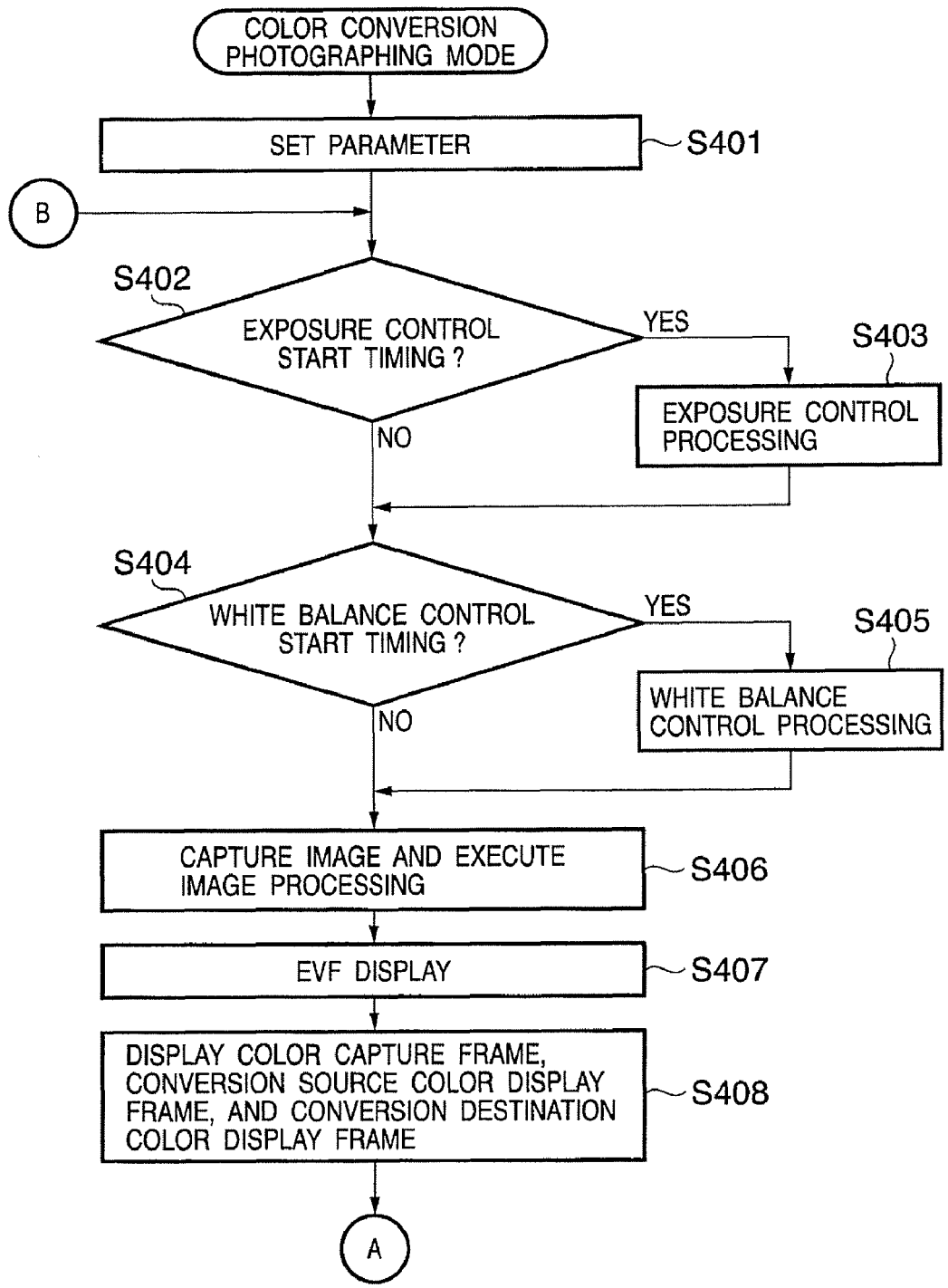
FIG. 4A is a flowchart for explaining processing in a color conversion mode according to the embodiment of the present invention.
Figure 4B:
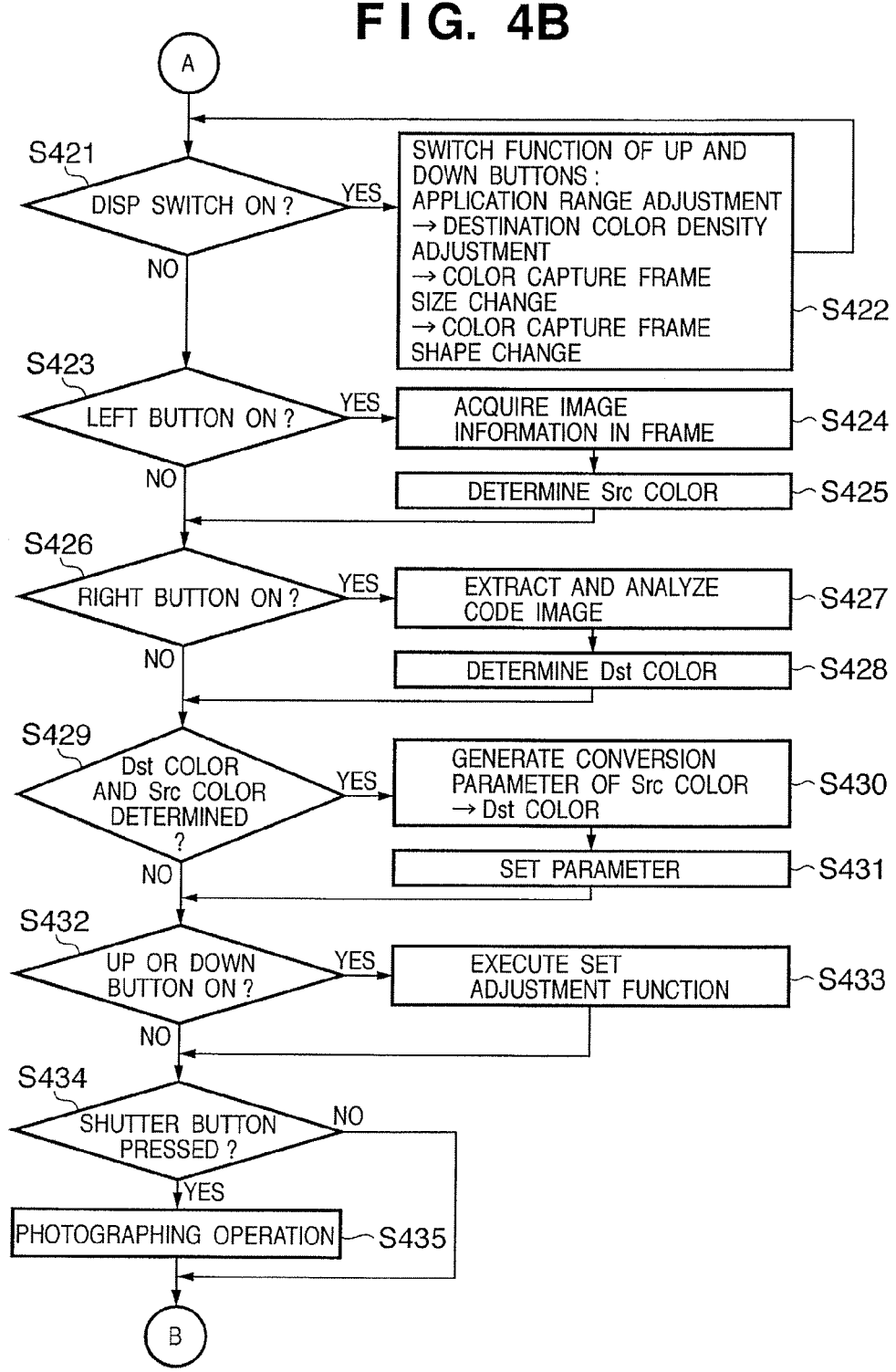
FIG. 4B is a flowchart for explaining processing in the color conversion mode according to the embodiment of the present invention.

FIGS. 4A and 4B are flowcharts for explaining the processing of the digital camera of this embodiment upon photographing in the color conversion mode. Since a normal photographing mode other than the color conversion mode is the same as that in the operation of a general digital camera, a description will be limited to that of the color conversion mode. Note that the system controller 109 mainly executes the processing to be described.

If the user sets the photographing mode of the digital camera in the color conversion mode, previous setting parameters set in the previous color conversion mode are set as those of the color conversion processor 311 in step S401. The system controller 109 checks in step S402 if an exposure control start timing is reached. If the exposure control start timing is reached, the exposure controller 111 executes the exposure processing in step S403. This exposure processing includes exposure settings required to display an image on the EVF. If this exposure processing is executed frequently, it causes flickering of the screen. Hence, the execution interval of the exposure processing is set based on a time constant. For example, the time constant is set to execute the exposure processing once every two seconds. Therefore, YES is determined in step S402 at this time interval, and exposure control is done in step S403.

The system controller 109 checks in step S404 if a white balance control start timing is reached. If the white balance control start timing is reached, the process advances to step S405 to execute the white balance control processing. Since the white balance control processing is executed frequently, it also causes flickering of the screen as in the exposure processing. Hence, the time constant is set to execute the white balance control processing, e.g., once every five seconds. In the white balance control processing, white balance coefficients required to execute white balance processing are obtained to update those used in the image processor 110.

In step S406, an image is captured to have an aperture value set in the exposure control in step S403, and the image processor 110 applies image processing to a through image as a real-time output from the image sensing element 103 using the white balance coefficients set in step S405. In step S407, the LCD 204 (image display unit 116), which serves as the EVF, displays the image data which has undergone the image processing in step S406. Furthermore, in step S408 the LCD 204 also displays the color capture frame 802, a conversion source color display frame 803, and a conversion destination color display frame 804 shown in FIG. 8A or 8B to superimpose them on the image displayed on the EVF.

Figure 8A:
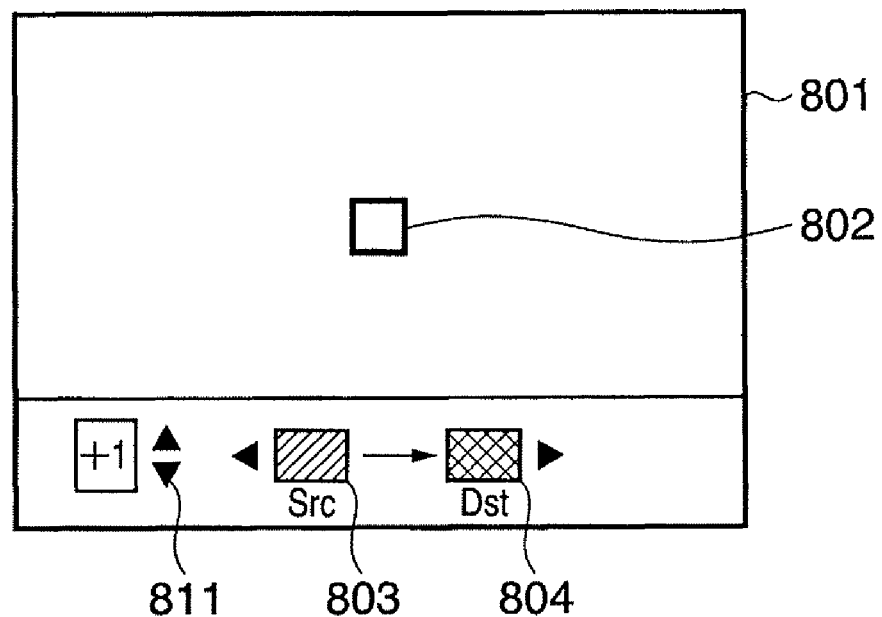
FIGS. 8A and 8B show EVF screen examples in a conversion source color/conversion destination color capture mode according to the embodiment of the present invention.
Figure 8B:
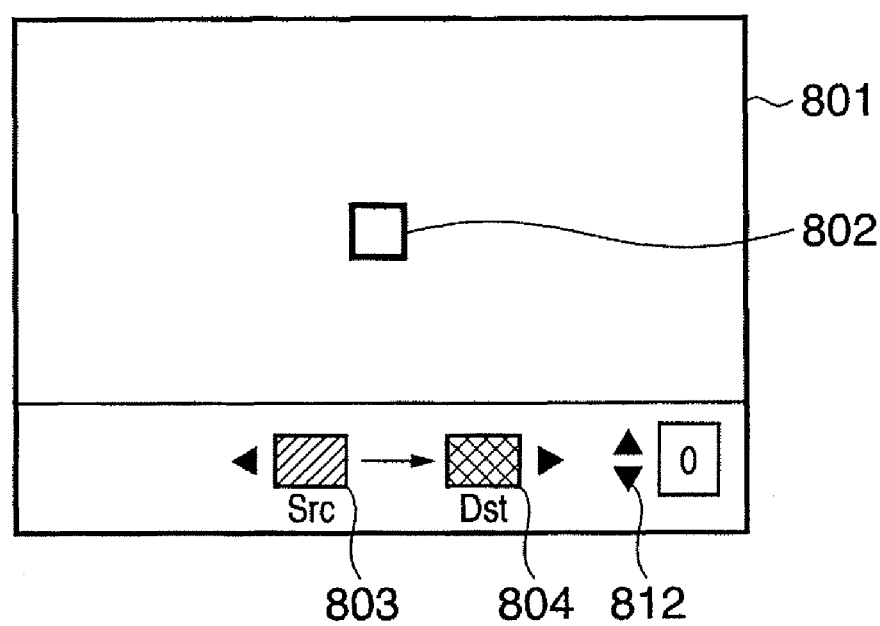

With the processes in steps S406 and S407, the LCD 204 displays the EVF screen 801 shown in FIG. 8A or 8B. As shown in FIG. 8A, the LCD 204 displays the EVF screen 801, the color capture frame 802, the conversion source color display frame 803, and the conversion destination color display frame 804 in the color conversion mode. In this state, by predetermined operations using the operating portion 129, the conversion source color and the conversion destination color for the aforementioned "parameter settings" can be set (steps S423 to S428, S432, and S433). Also, in this state, conditions (the application range of the conversion source color, the density of the conversion destination color, the size and shape of the color capture frame, and the like) associated with "parameter settings" can be adjusted (steps S421 and S422). Furthermore, in this state, an image can be taken upon operation of the shutter button 203 (steps S434 and S435). An arrow is displayed between the conversion source color display frame 803 and the conversion destination color display frame 804 to indicate the direction of color conversion in an easy-to-understand manner. Note that the adjustment of the application range of the conversion source color will be referred to as "application range adjustment" hereinafter (to be described in detail later). Also, the adjustment of the density of the conversion destination color will be referred to as "conversion destination color density adjustment" hereinafter.

This embodiment uses buttons arranged in the horizontal direction of the cross button 209 in operations for setting the conversion source color and the conversion destination color. More specifically, the left button of the cross button 209 is used to set the conversion source color, and the right button is used to set the conversion destination color. The display positional relationship between the conversion source color display frame 803 and the conversion destination color display frame 804 corresponds to the assignment of these operation buttons, thus allowing more intuitive operations of the user. When the release button is pressed by an index finger while the image sensing apparatus is held by the right hand upon photographing, the cross button 209 is located at the position where it can be operated by a thumb. Hence, the user can also make the color conversion operation in the same address as that upon photographing.

Furthermore, this embodiment uses buttons arranged in the vertical direction of the cross button 209 to adjust the conditions associated with "parameter settings". A display mark 811 is displayed when the "application range adjustment" is assigned to the buttons in the vertical direction. Also, a display mark 812 is displayed when "conversion destination color density adjustment" is assigned to the buttons in the vertical direction. In this embodiment, the display button 208 serves as a switch used to instruct the apparatus to change the adjustment function assigned to the up and down buttons in the color conversion mode. Every time the user presses the display button 208, the function of the up and down buttons is changed in turn like application range adjustment→destination color density adjustment→color capture frame size change→color capture frame shape change→application range adjustment, . . . (steps S421 and S422). Note that the "capture frame size change" changes the size of the color capture frame 802, and the "capture frame shape change" changes the shape of the color capture frame 802.

How to set the conversion source color and the conversion destination color in the image sensing apparatus of this embodiment will be described below. In order to designate the conversion source color, the user adjusts the direction and optical zooming of the image sensing apparatus 100 to set a field angle so as to fully display a desired color within the color capture frame 802. Upon pressing of the left button of the cross button 209, the system controller 109 determines that a conversion source color capture instruction is input, and the process advances from step S423 to step S424. The system controller 109 acquires pixel data of an image within the color capture frame 802 at that time in step S424, and calculates their average value and determines it as a conversion source color (Src color) in step S425. After the conversion source color is determined, the conversion source color display frame 803 displays a patch indicating the conversion source color.

Figure 13A:
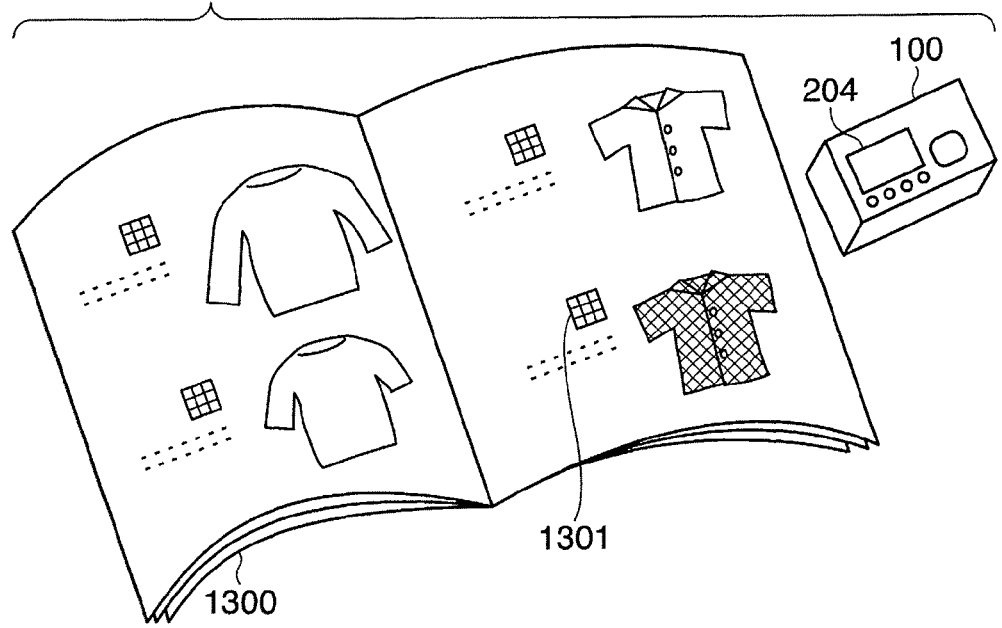
FIGS. 13A to 13C are views for explaining the setting of a conversion destination color according to the first embodiment.

Likewise, in order to determine the conversion destination color, the user makes the EVF of the image sensing apparatus 100 display an image of printed matter 1300 (e.g., a brochure or magazine) including a code image 1301 which includes color value information, as shown in FIG. 13A. The user presses the right button of the cross button 209 so that a desired code image falls within the color capture frame 802, as shown in the EVF display example of FIG. 13B. Upon pressing of the right button of the cross button 209, the system controller 109 determines that a conversion destination color capture instruction is input, and the process advances from step S426 to step S427. In step S427, the system controller 109 extracts and analyzes the code image in the color capture frame 802 to acquire a conversion destination color described in the code image. Note that the conversion destination color is described using values of a color system such as sRGB, Lab, or the like, and the code image also includes information indicating the color system used to describe color values. Therefore, the image sensing apparatus 100 can specify a color value based on the color system and color value obtained from the code image, and determines the color value obtained in step S427 as a conversion destination color (Dst color) in step S428. After the conversion destination color is determined, the conversion destination color display frame 804 displays a patch indicating the conversion destination color.

For example, assume that the printed matter 1300 shown in FIG. 13A is a brochure of clothes, and information indicating the color value of each cloth is described as the code image 1301 in the vicinity of the corresponding sample photo. The user sets this image code to fall within the color capture frame on the EVF and presses the right button of the cross button 209, thus accurately and easily setting the color on the brochure as a destination color.

Note that the average of pixel values within the color capture frame 802 is calculated in step S425, and is determined as the conversion source color. However, the present invention is not limited to this. For example, pixel data used in such case may be either image data decimated for display on the electronic viewfinder (image data stored in the image display memory 113) or image data stored in the memory 114.

After the conversion source color and the conversion destination color are determined in steps S425 and S428, the process advances from step S429 to step S430. In step S430, the system controller 109 generates conversion parameters required to convert the conversion source color into the conversion destination color. This embodiment changes the values of grid points which form a cubic grid that includes the conversion source color of the 3D lookup table, as has been described above using FIG. 9 and the like. In step S431, the 3D lookup table of the color conversion processor 311 is updated to set the parameters. The subsequent image processes of the image processor 110 upon image display on the EVF (steps S406 and S407) and upon execution of photographing (steps S434 and S435) use the 3D lookup table updated in the color conversion processor 311. Upon execution of photographing, a signal SW1 is generated at the half-stroke position of the shutter button 203. In response to this signal SW1, AF (auto-focus) processing, AE (auto exposure control) processing, AWB (auto white balance) processing, EF (flash pre-emission) processing, and the like for photographing are executed. A signal SW2 is generated at the full-stroke position of the shutter button 203 to execute a series of photographing processes.

Figure 10:
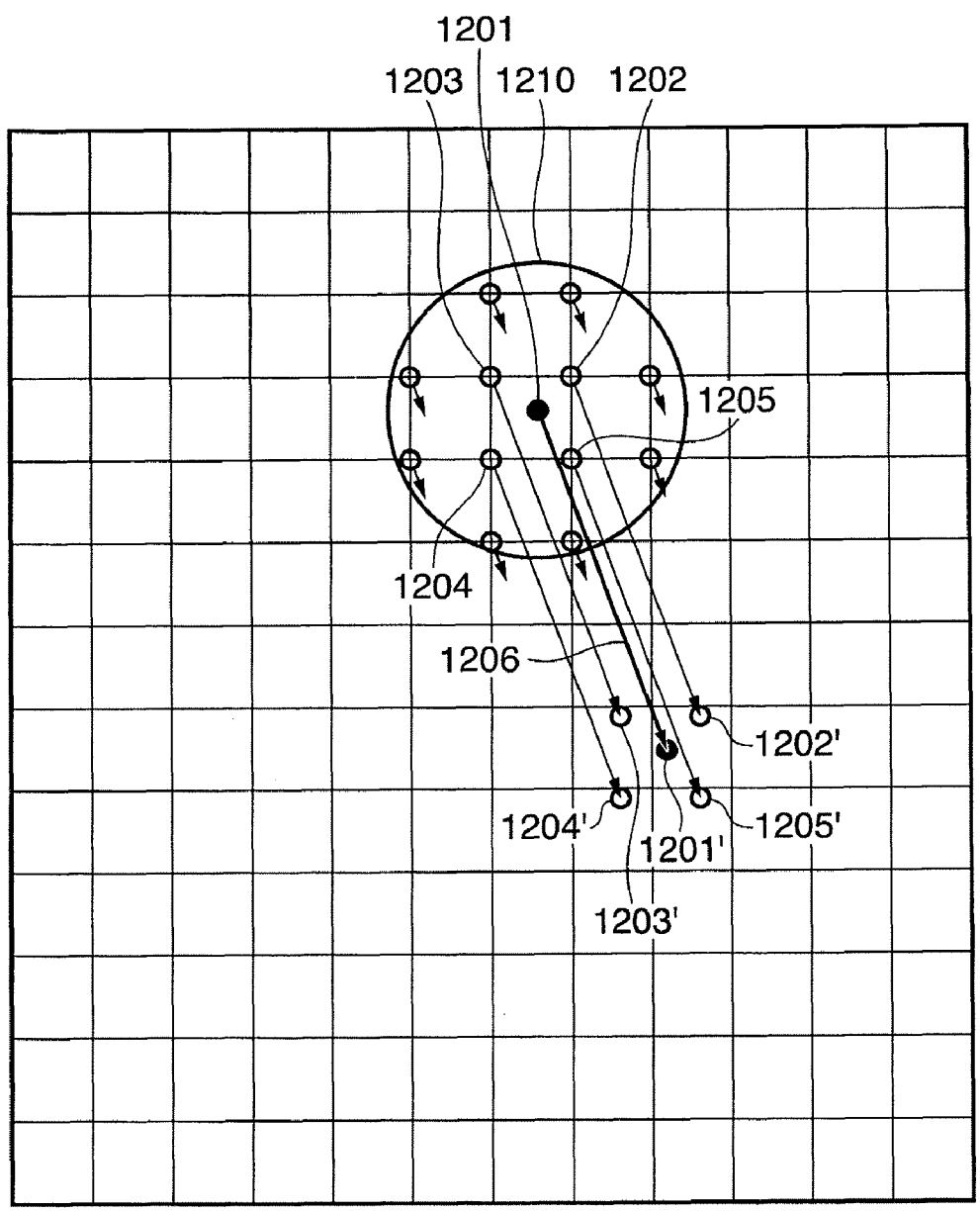
FIG. 10 is a view for explaining an application range of a conversion source color.

Upon pressing of either of the up and down buttons of the cross button 209, the process advances from step S432 to step S433, and the adjustment function assigned to the up and down buttons at that time is executed (the adjustment function is assigned in step S422). For example, when "application range adjustment" is set for the up and down buttons, the mark 811 is displayed near the conversion source color display frame 803, as shown in FIG. 8A, to indicate that application range adjustment using the up and down buttons is currently available. In this state, if the user presses the up button, the application range is enlarged. If the user presses the down button, the application range is reduced. The application range is expressed by a level value such as −1, 0, +1, or the like. An example of application range adjustment will be described below with reference to FIG. 10. Note that a description of FIG. 10 will be given using a 2D lookup table for the sake of simplicity.

Assume that the user designates the color value of a point 1201 as the conversion source color, and the color value of a point 1201' as the conversion destination color. In this case, vertices 1202 to 1205 of grids which include the point 1201 are moved along a vector 1206 which connects the points 1201 and 1201', thus setting the values of points 1202' to 1205'. According to a level value set as the application range, the size of a circle 1210 is determined. The circle 1210 having a size according to the level value is allocated to have the point 1201 as the center. In this state, grid points except for the grid points 1202 to 1205 within the circle 1210 are moved in the same direction as that of the vector 1206. However, their sizes (moving amounts) are different. For example, the size assumes a value obtained by multiplying the size of the vector 1206 by a coefficient which assumes 1 at the center of the circle 1210, 0 on the circumference, and becomes smaller according to the distance from the center. For example, let r be the radius of the circle 1210, and p be the distance between a given grid point in the circle 1210 and the grid point 1201. Then, the vector 1206 is multiplied by k=(r−p)/r to determine the motion vector of that grid point. As the level value becomes larger, the radius r of the circle 1210 becomes larger, and the application range of the conversion source color broadens. When the aforementioned processing is applied to the 3D lookup table shown in FIG. 9, the grid can be replaced by the cubic grid, and the circle 1210 can be replaced by a sphere.

As described above, when the user issues an enlargement/reduction instruction of the application range, the radius r of the circle 1210 (sphere) is changed to set the parameters in step S430. That is, the number and change amounts of the grid points, which change according to the level value of the application range, are changed in step S431. However, even when the level value assumes a lowest value, all vertices which form the cubic grid including the conversion source color must be included.

Figure 11A:
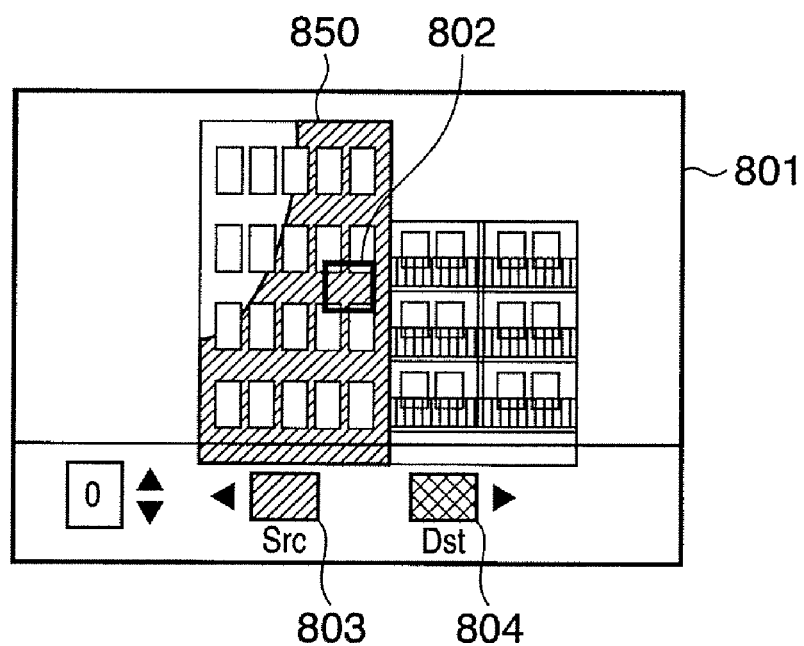
FIGS. 11A and 11B show adjustment examples of the application range of a conversion source color.
Figure 11B:
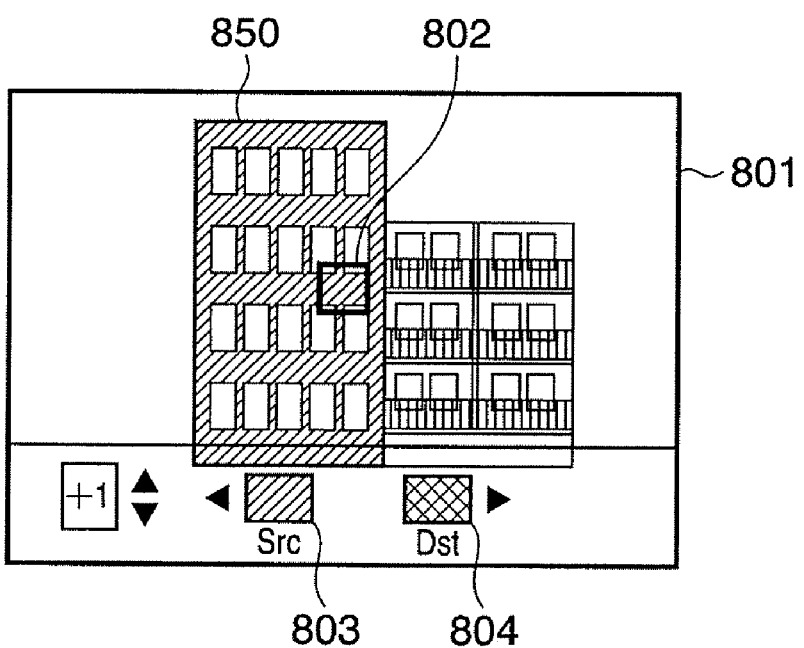

For example, FIG. 11A shows a state wherein the user designates the color of the wall of a building 850 as the conversion source color, but the entire building 850 cannot fall within the range of the conversion source color. When the user increases the level of the application range to +1 using the up or down button in this state, the range of the conversion source color is enlarged, and adjustment can be attained to include the entire wall of the building 850 in the conversion source color, as shown in FIG. 11B. Conversely, when the user decreases the level of the application range, the range of the conversion source color is reduced. For example, when the range of the conversion source color also includes the color of the wall of a building which neighbors the building 850 to be converted, it can be limited to fall within the range of the color of the wall of the building 850 by reducing the level of the application range of the conversion source color.

If destination density adjustment is selected in steps S421 and S422, the mark 812 is displayed near the conversion destination color display frame 804, as shown in FIG. 8B, to indicate that the density of the conversion destination color can be currently adjusted using the up and down buttons. The conversion destination color density is also set using a level value, so that the density of the conversion destination color (FIG. 10, point 1201') can be adjusted stepwise. With this adjustment, the color value of the destination color upon generation of the conversion parameters in step S431 is changed. Note that the color value of the destination color moves on the color space along a direction to change density upon changing density. Upon changing hue, the color value moves to go around a hue circle. As a more practical change method of the color value, a color value expressed on a YUV space is converted into a value on an HSV space to change a hue value (H) and density (gain or saturation (S)), and the changed color value is re-converted into that on the YUV space.

When the user designates "color capture frame size change" upon operation of the display button 208 (steps S421 and S422), the size of the color capture frame 802 changes stepwise by operating the up or down button. When the user designates "color capture frame shape change", the shape of the color capture frame 802 changes like, for example, square→vertically elongated rectangle→horizontally elongated rectangle→triangle→downward triangle→circle, every time the user operates the up button. When the user operates the down button, the shape of the color capture frame 802 changes in the reverse order. Note that, for example, a configuration that moves the color capture frame 802 by a combination of the SET button 206 and cross button 209 may be added.

The EVF display processing in step S407 alternately displays data of the conversion result using the 3D lookup table and the image which does not undergo conversion using the 3D lookup table. In this manner, the user can alternately observe the color conversion state and that before color conversion, and can recognize the change state as a result of color conversion in real time. Note that such display can be implemented by alternately repeating execution and non-execution of color conversion using the 3D lookup table in the color conversion processor 311.

As described above, according to this embodiment, even the limited user interface of the image sensing apparatus allows the user to easily set the conversion destination color using the image code. Also, even the limited user interface of the image sensing apparatus allows the user to easily and clearly set the conversion source color. For this reason, the user can perform desired color conversion upon photographing by a simple operation.

When the adjustment function using the up and down buttons is assigned to a single adjustment item (e.g., only application range adjustment), the function switching processing in steps S421 and S422 can be omitted. This embodiment uses the buttons in the horizontal direction of the cross button to issue a color capture instruction, and those in the vertical direction of it to issue an adjustment instruction. However, the present invention is not limited to such specific key assignment. For example, the buttons in the vertical direction may be used to issue a color capture instruction, and those in the horizontal direction may be used to issue an adjustment instruction. In this case, the display frames 803 and 804 may be displayed to be arranged in the vertical direction, thus providing a user-friendly interface.

In the processing sequence shown in FIG. 4B, the color is immediately captured in response to the operation of the right or left button. However, the present invention is not limited to this. For example, the left or right button may be used to set a standby state for conversion source color capture or a standby state for conversion destination color capture, and a color may be actually captured upon pressing of the shutter button 203. In this case, in FIG. 4B, upon operation of the left button, the process may advance to the conversion source color capture standby state, and steps S424 and S425 may be executed upon pressing of the shutter button 203. Also, upon operation of the right button, the process may advance to the conversion destination color capture standby state, and steps S427 and S428 may be executed upon pressing of the shutter button 203.

As described above, the user selects which of the conversion source color and the conversion destination color is to be captured by pressing the left or right button, and presses the shutter button while directing the image sensing apparatus toward an object from which the color is to be captured or a code image. In this way, the user can make the color capture operation by the same operation as in normal photographing. Hence, the operability of the image sensing apparatus can be improved.

Furthermore, in FIG. 4B, the adjustment function using the up and down buttons is always enabled. Alternatively, after a color is captured using the left or right button and is settled using another key, the up and down buttons may be enabled. For example, after the conversion source color is captured by the left button and is settled using another key (e.g., the SET button 206), adjustment of the application range using the up and down buttons may be enabled.

When the adjustment function items that can be assigned to the up and down buttons are the only application range adjustment and conversion destination color density adjustment, the function switching processing in steps S421 and S422 is omitted.

As described above, according to the first embodiment, the user can designate a conversion destination color using a code image. For this reason, the user can easily set the color of matter to be printed, such as a brochure or the like, resulting in user convenience.

Second Embodiment

The first embodiment extracts a code image from an image displayed on the EVF, and determines a conversion destination color by analyzing the extracted code image. The second embodiment extracts a code image from an already captured image stored in the recording unit 139 (or recording unit 142), and determines a conversion destination color by analyzing the extracted code image.

Figure 14:
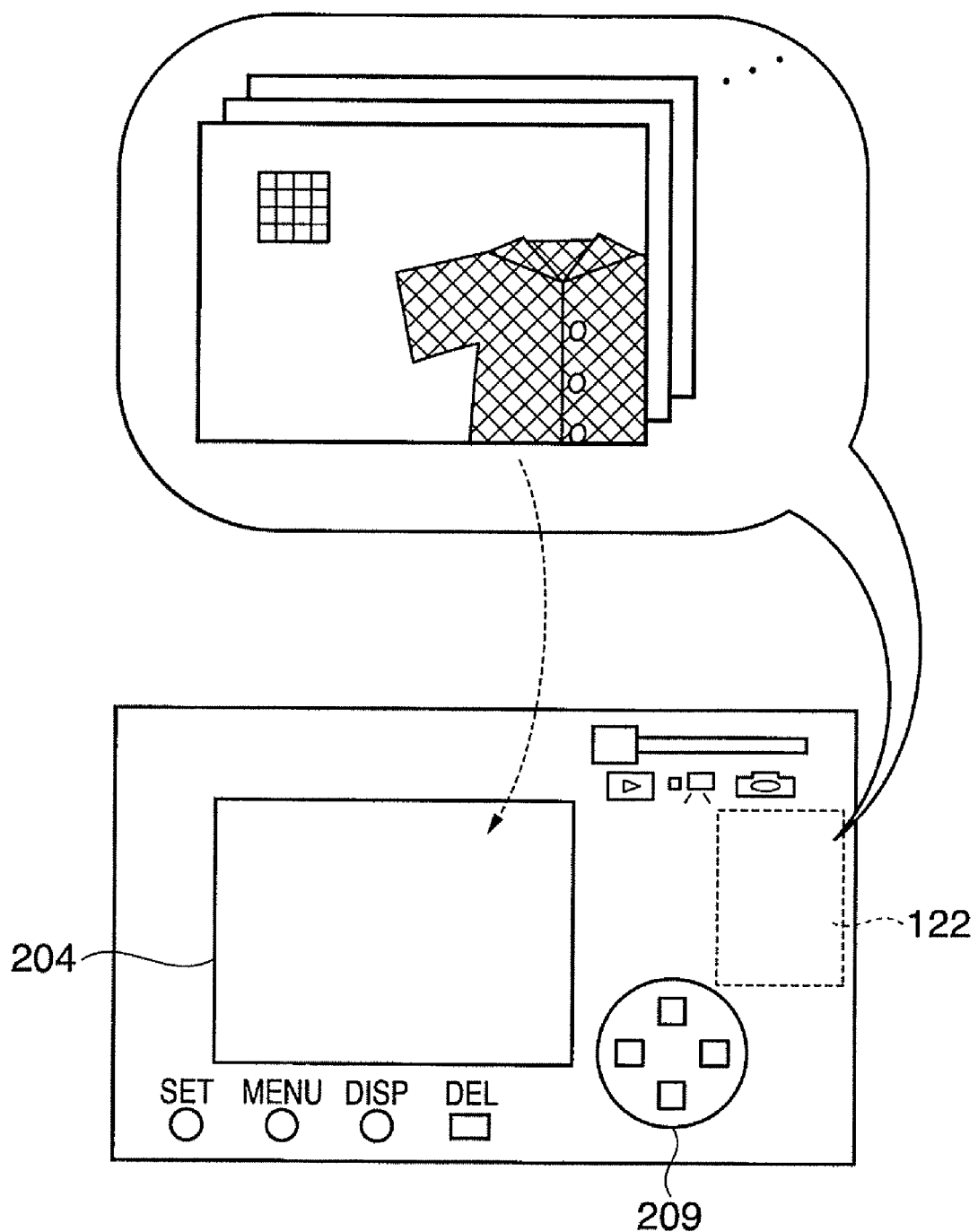
FIG. 14 is a view for explaining the setting of a conversion destination color according to the second embodiment.

For example, as shown in FIG. 14, the recording medium 122 inserted in the image sensing apparatus 100 records images including code images as already captured images.

Figure 15:
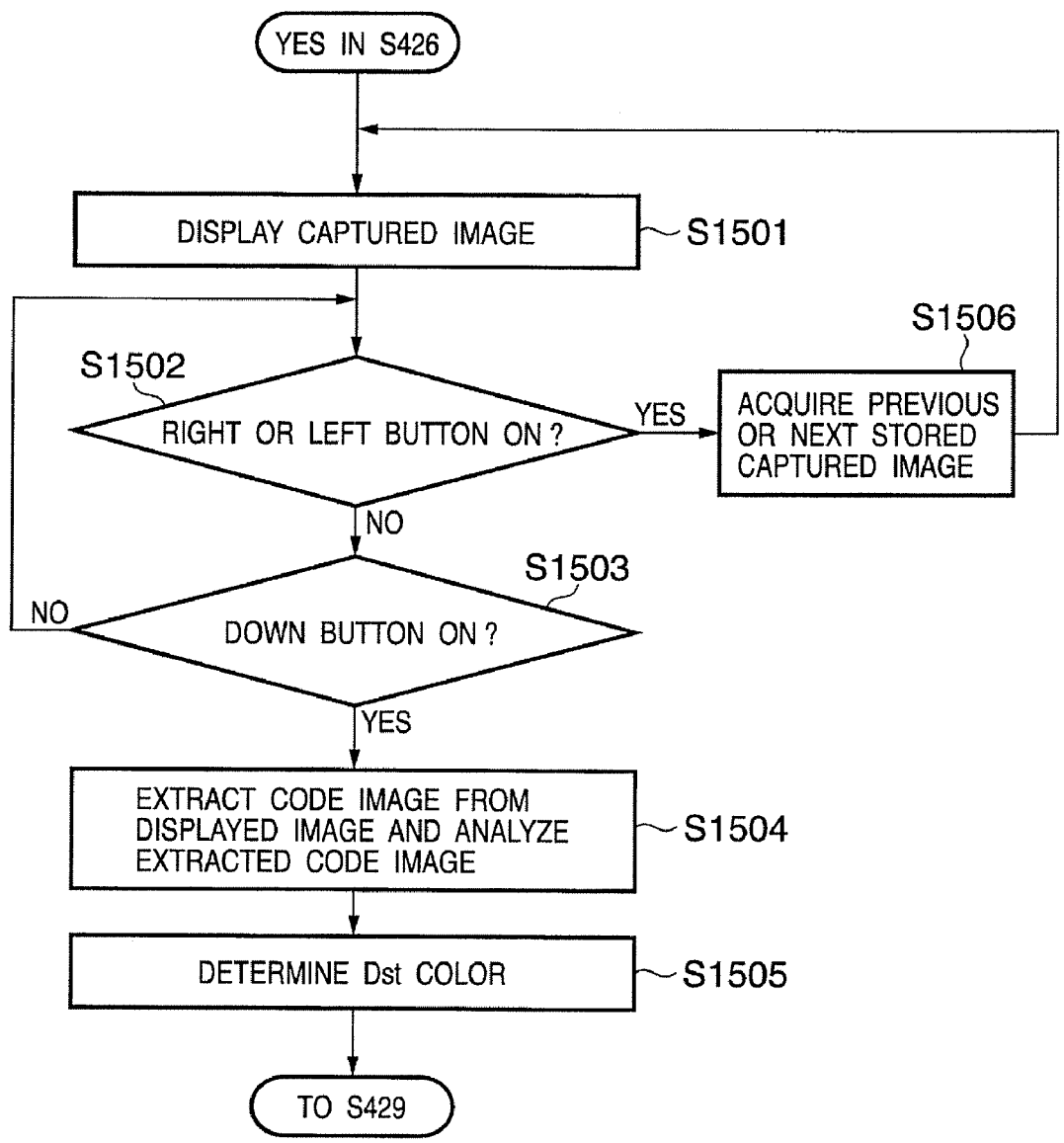
FIG. 15 is a flowchart for explaining the setting processing of a conversion destination color according to the second embodiment.

FIG. 15 is a flowchart for explaining the determination processing of a conversion destination color according to the second embodiment. Note that the system controller 109 executes the processing shown in the flowchart of FIG. 15. Steps S1501 to 1506 in FIG. 15 replace the processes in steps S426 to S428 in FIG. 4B. Note that setting of the conversion destination color can be switched between the processes in step S427 and S428 (first embodiment) and in steps S1501 to S1506 (second embodiment).

In step S1501, the LCD 204 displays an already captured image (captured image including a code image) recorded in the recording medium 122. When the user operates the right or left button of the cross button 209, the process advances from step S1502 to step S1506 to switch an already captured image to be displayed on the LCD 204. More specifically, when the user presses the left button of the cross button 209, an already captured image immediately before the displayed image is acquired. When he or she presses the right button of the cross button 209, an already captured image immediately after the displayed image is acquired. The process returns to step S1501 to display the acquired image on the LCD 204.

Figure 13B:
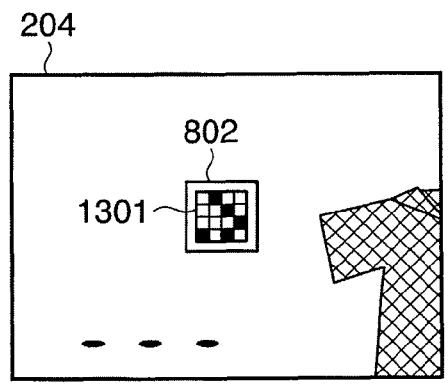
Figure 13C:
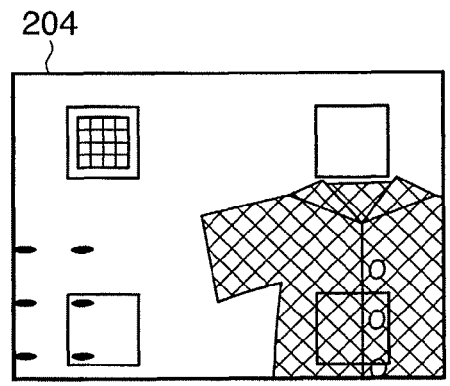

When the user presses the down button of the cross button 209 while the LCD 204 displays a desired image, the process advances from step S1503 to step S1504. In step S1504, a code image is extracted from the currently displayed image, and is analyzed. The code image is obtained from a predetermined position (for example, the position of the frame 802). In order to realize this, the EVF displays the frame 802 used to guide the position where the code image is to be recorded upon capturing an image, and the user captures an image so that the code image falls within the frame, as shown in FIG. 13B. At this time, the EVF may display a plurality of frames 802, as shown in FIG. 13C, and the user may capture an image so that the code image falls within one of these frames. In this case, upon extracting the code image in step S1504, the processing for detecting a code image from these plurality of frames is executed. In step S1505, a conversion destination color is set according to a color value acquired in step S1504.

According to the aforementioned arrangement of the second embodiment, since printed matter that describes a code image corresponding to a desired color is captured in advance, the user can set a desired destination color even when that printed mater is not available at that place, resulting in convenience.

Third Embodiment

In the first and second embodiments, information included in the code image is a single color value. However, in consideration of an information size that the code image can include, a plurality of color values can be registered. The third embodiment allows the user to select one of a plurality of color values registered in a code image upon setting a conversion destination color. If a description that indicates a color section name and a color value are registered and that the color section name is displayed upon setting a conversion destination color, the user can easily recognize the color acquired by that code image. Even if only one color value is registered, displaying the color section name enhances convenience.

Figure 16:
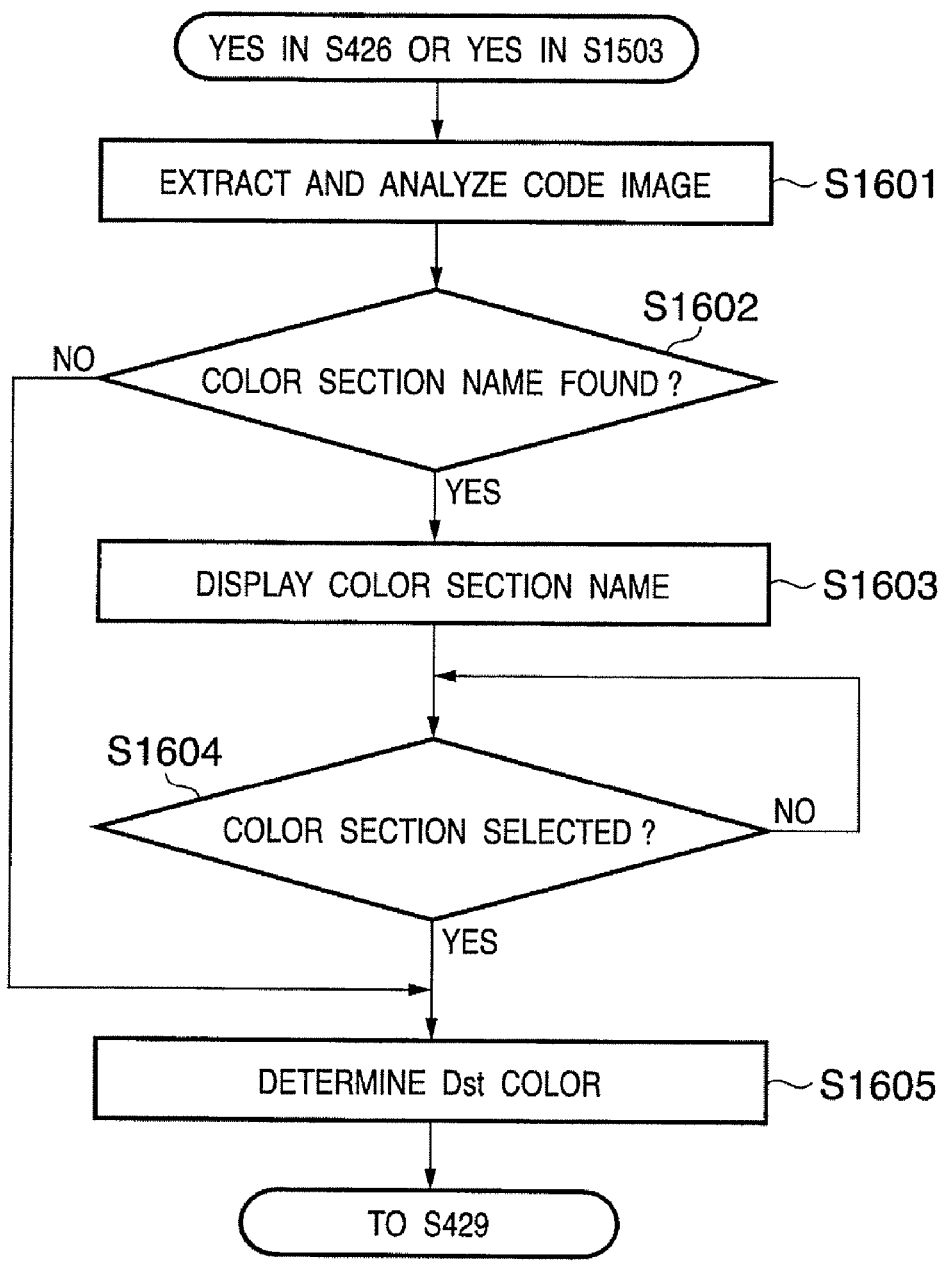
FIG. 16 is a flowchart for explaining the setting processing of a conversion destination color according to the third embodiment.

FIG. 16 is a flowchart for explaining the conversion destination color setting processing according to the third embodiment. Note that the system controller 109 executes the processing shown in the flowchart of FIG. 16. Also, the processes in steps S1601 to S1605 in FIG. 16 are executed in place of steps S427 and S428 of the first embodiment (FIG. 4B) or steps S1504 and S1505 of the second embodiment (FIG. 15).

Figure 17:
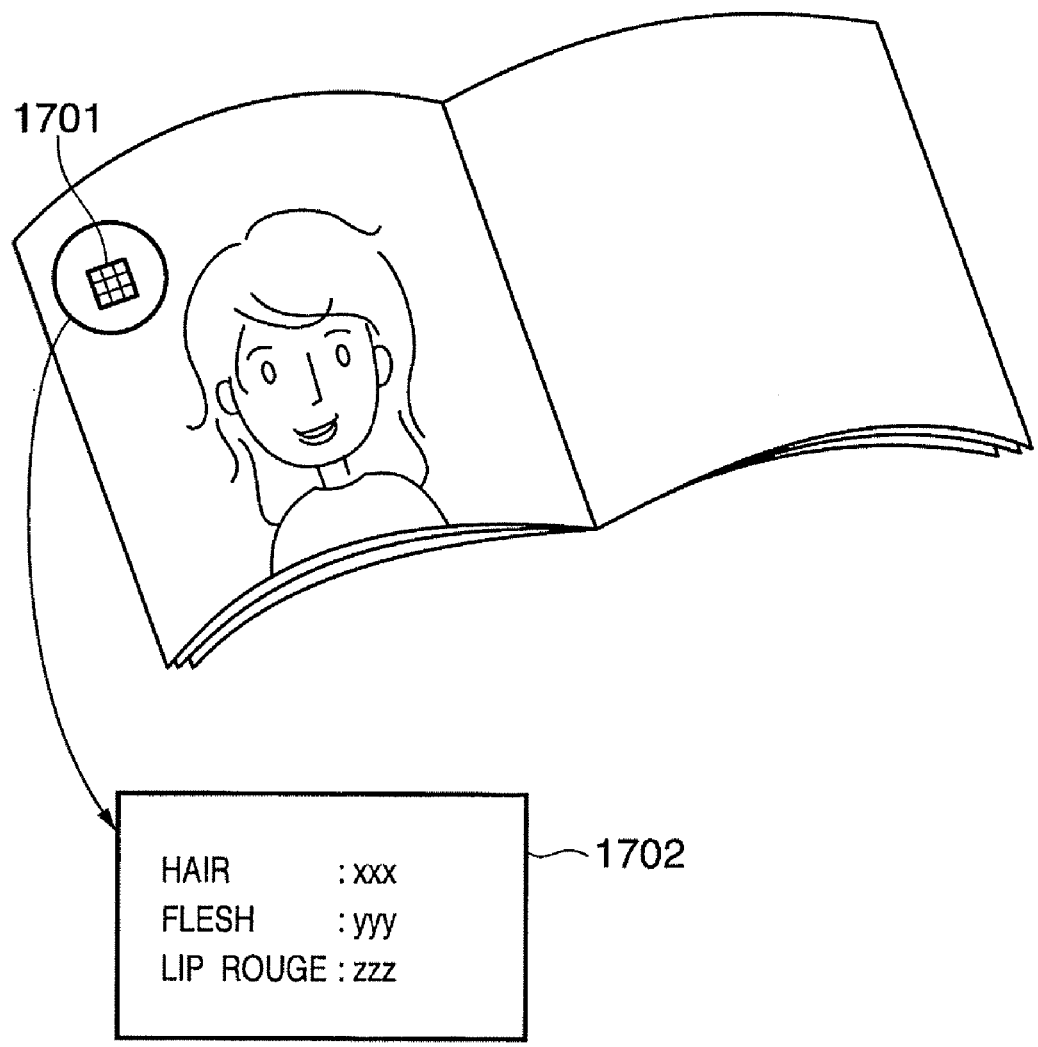
FIG. 17 is a view for explaining color information of a code image according to the third embodiment.

In step S1601, a code image is extracted from an image displayed on the EVF (in case of the first embodiment) or an already captured image played back on the LCD 204 (in case of the second embodiment), and is analyzed. The code image to be handled in the third embodiment is registered with a plurality of color values, as shown in, e.g., FIG. 17. In FIG. 17, color values for three color section names "hair", "flesh", and "lip rouge" are registered together with the color section names, as shown in code images 1701 and 1702. By analyzing such code image 1701, three color values corresponding to the three color section names are acquired.

Figure 18:
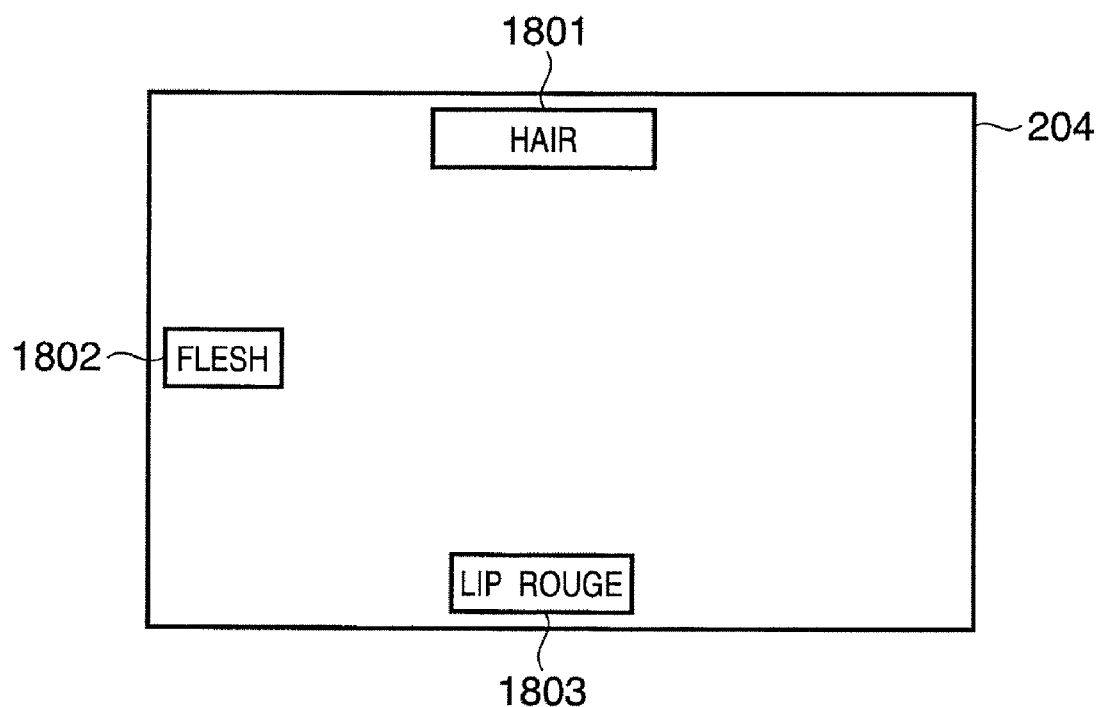
FIG. 18 shows a display state example of color section names according to the third embodiment.

As a result of the analysis in step S1601, if pairs of color section names and color values are registered in the code image, the process advances from step S1602 to step S1603. In step S1603, the LCD 204 displays the color section names. FIG. 18 shows a display example of the color section names. The LCD 204 displays indications 1801 to 1803 of the color section names to superimpose them on the EVF display. In FIG. 18, the LCD 204 displays the color section names on its respective sides one by one in correspondence with the respective directions of the cross button 209, and the user designates a desired color section name by pressing one of the right, left, up, and down buttons of the cross button 209. Since the three pairs of color section names and color values are registered in the example of FIG. 17, the LCD 204 displays the color section names at three positions, as shown in FIG. 18. When the user inputs a section selection instruction using the cross button 209, the process advances from step S1604 to step S1605, and the color value corresponding to the selected color section name is set as a conversion destination color. On the other hand, if no color section name is registered, and only the color value is acquired, the process jumps from step S1602 to step S1605, and the acquired color value is determined as a conversion destination color.

Note that the LCD 204 displays the color section names on its respective sides one by one, and the user selects one of the color section names using the cross button 209 in step S1603. In this case, the user can quickly select the color section. However, the maximum number of colors that can be designated per code image is four. Therefore, the color section name selection method is not limited to such method. For example, color section names may be sequentially switched and displayed upon operation of a predetermined button. In this case, when the user makes a predetermined determination operation (for example, he or she presses the SET button 206) when a desired color section name is displayed, the color value to be set as a conversion destination color is determined. Also, in the method of displaying the color section names in the vicinity of respective sides of the LCD 204, the display may be switched to have four sections as one unit. For example, when section names A to G are available, the apparatus is controlled to display names A to D first, and then display the remaining names E to G in response to a predetermined operation.

As described above, according to the third embodiment, one code image can be used to register a plurality of colors, and the user can easily select a desired color from such code image.

Fourth Embodiment

In the first to third embodiments, the user designates a conversion source color using an image displayed on the EVF, and the color conversion processing is applied to a captured image later. The fourth embodiment allows the user to designate a conversion source color using an already captured image, and applies the color conversion processing based on the conversion source color and a conversion destination color to the already captured image.

Figure 19:
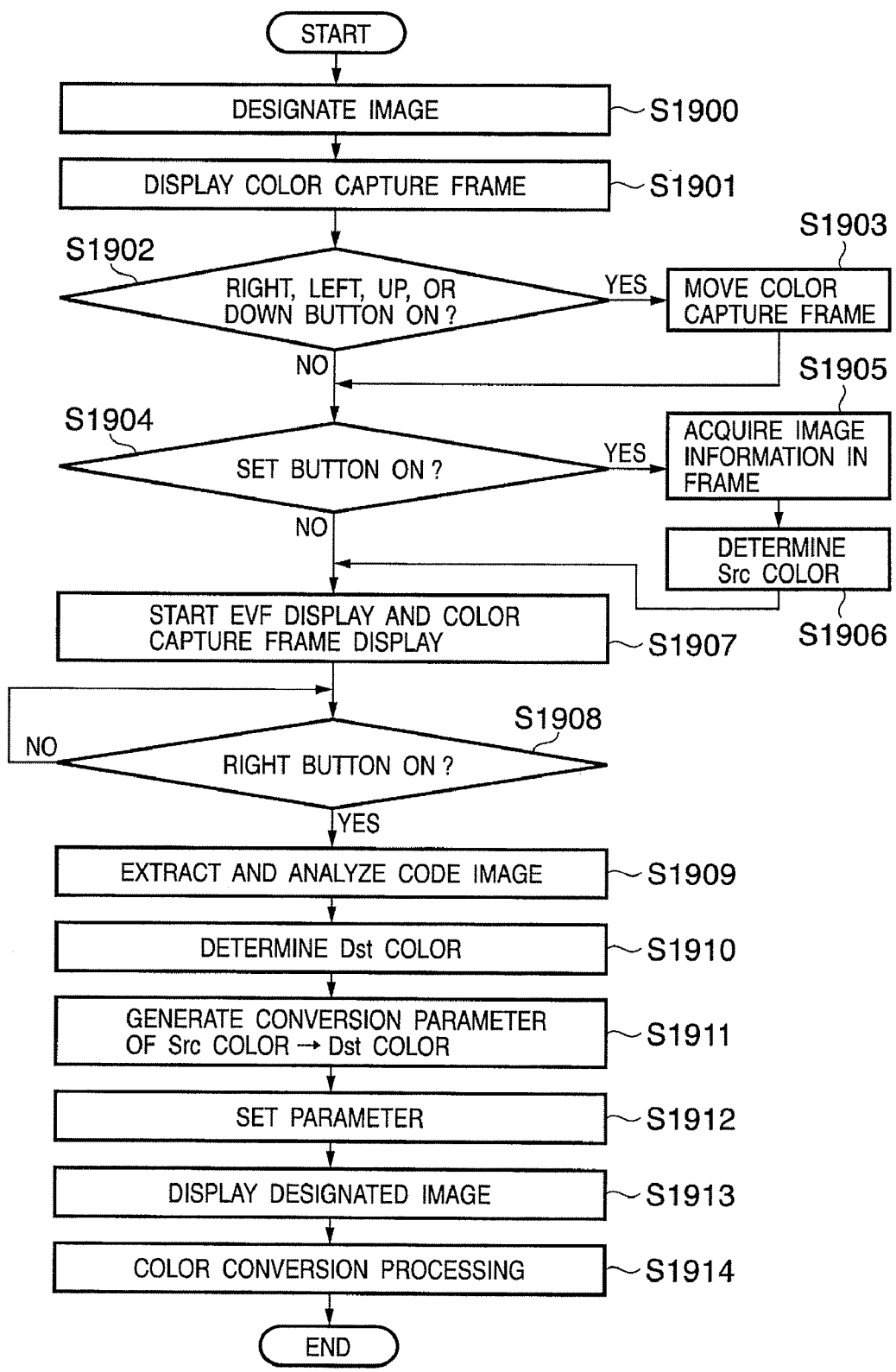
FIG. 19 is a flowchart for explaining color conversion processing according to the fourth embodiment.
Figure 20:
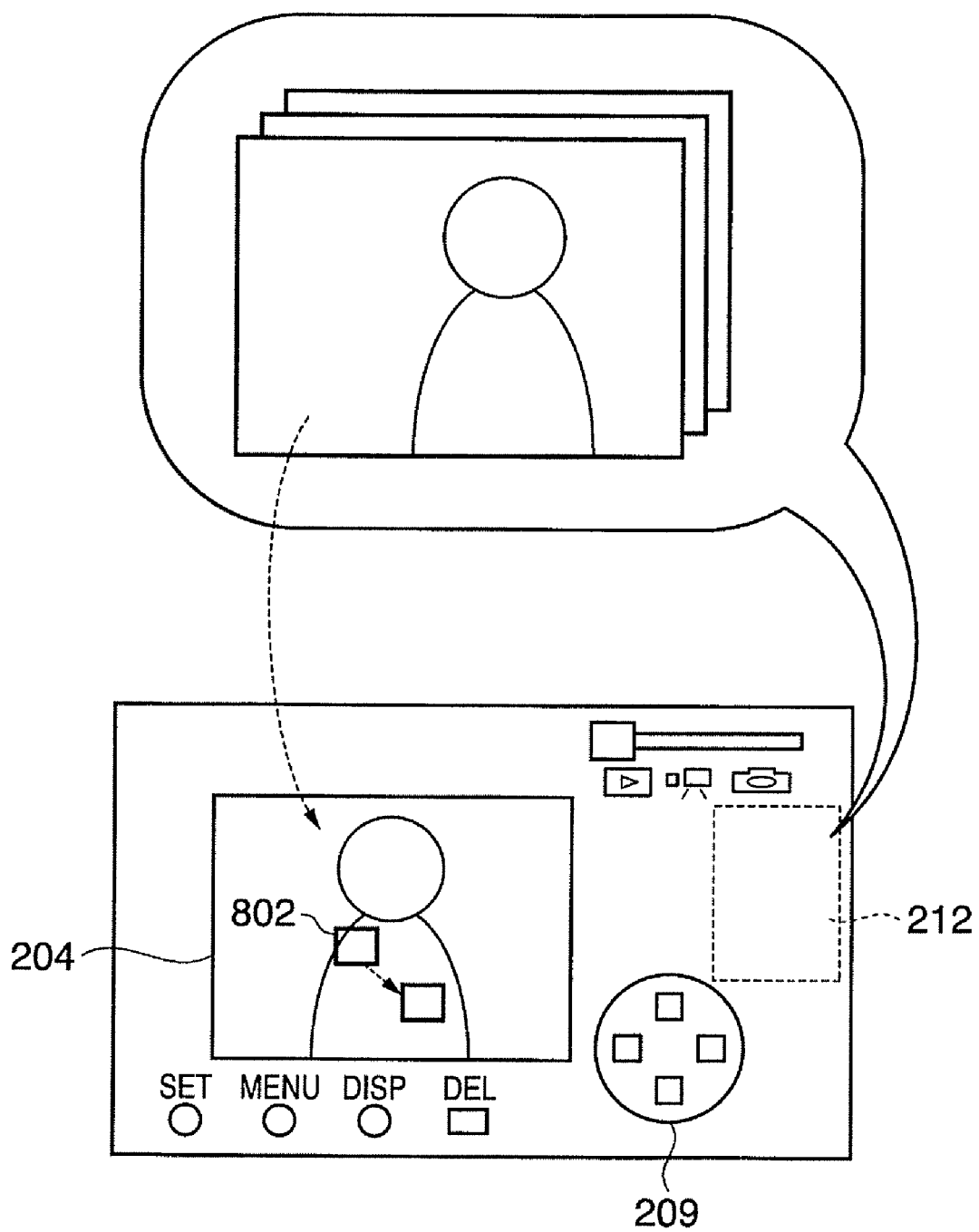
FIG. 20 is a view for explaining the setting of a conversion source color according to the fourth embodiment.

FIG. 19 is a flowchart for explaining the processing of the fourth embodiment. The system controller 109 executes the processing shown in the flowchart of FIG. 19. In step S1900, the LCD 204 displays an already captured image recorded in the recording medium 122. Images to be displayed on the LCD 204 are sequentially switched and displayed by, e.g., the right or left button of the cross button 209. When the user operates the SET button 206 when a desired image is displayed, he or she selects the displayed image as a designated image. Upon determining the designated image, the LCD 204 superimposes the color capture frame 802 on the displayed designated image in step S1901. FIG. 20 shows a display example of the displayed designated image and the color capture frame 802 on the LCD 204.

In steps S1902 and S1903, the user moves the color capture frame 802 to a desired position by operating the cross button 209, as shown in FIG. 20, so that a color to be designated as a conversion source color fully appears within the color capture frame 802. Upon pressing of the SET button 206, the process advances from step S1904 to step S1905. The system controller 109 acquires pixel data of an image within the color capture frame 802 at that time in step S1905, and calculates the average value of the acquired pixel data and determines the average value as a conversion source color (Src color) in step S1906.

After the conversion source color is set in this way, the EVF display starts in step S1907 and the color capture frame is displayed on the display screen. Note that the EVF display and the color capture frame display in step S1907 are implemented by executing, e.g., the processes in steps S401 to S408 in FIG. 4A.

In this state, the user makes the EVF of the image sensing apparatus 100 display printed matter 1300 including a code image 1301 which includes information of a color value, as shown in FIG. 13A, as in the first embodiment, so as to determine a conversion destination color. The user makes a desired code image fall within the color capture frame 802, as shown in the EVF display example of FIG. 13B, and then presses the right button of the cross button 209. Upon pressing of the right button of the cross button 209, the system controller 109 determines that a conversion destination color capture instruction is input, and the process advances from step S1908 to step S1909. In step S1909, the system controller 109 extracts and analyzes the code image in the color capture frame 802 to acquire a conversion destination color described in the code image. In step S1910, the system controller 109 determines the color value acquired in step S1909 as a conversion destination color (Dst color).

After the conversion destination color is determined, the system controller 109 generates conversion parameters required to convert the conversion source color into the conversion destination color in step S1911. The generation method of the conversion parameters has been described in step S430. In step S1912, the system controller 109 updates the 3D lookup table of the color conversion processor 311. After that, the system controller 109 displays the image designated in step S1900 again on the LCD 204 in step S1913, and converts the color value of the displayed image using the 3D lookup table in step S1914. As a result, the LCD 204 displays an image obtained by applying the color conversion processing to the designated image. Data of the conversion result using the 3D lookup table and the image which does not undergo conversion using the 3D lookup table are alternately displayed by repeating steps S1913 and S1914. In this manner, the user can alternately observe the color conversion state and that before color conversion, and can recognize the change state as a result of color conversion in real time.

With the above arrangement, the user can change designated colors of designated images in turn by capturing code images.

Another Embodiment

Figure 12A:
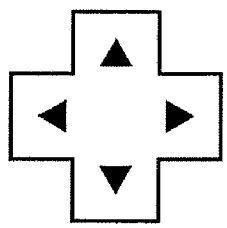
FIGS. 12A to 12D show modification examples of button switches.
Figure 12B:
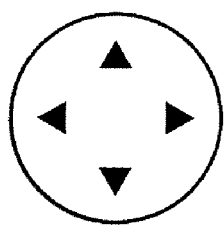
Figure 12C:
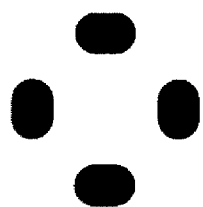
Figure 12D:
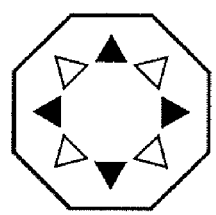

Note that each of the above embodiments adopts the cross button as a button group having button switches in a plurality of directions, as shown in FIG. 12A. Alternatively, other operation buttons may be used or dedicated buttons may be provided. For example, a button formed of a member that integrates four directions may be used, as shown in FIG. 12B, or one direction may be assigned to one button, and a plurality of directions may be assigned to a group of a plurality of buttons, as shown in FIG. 12C. Also, the present invention is not limited to the four directions, i.e., up, down, right, and left directions, and any of switches of four or more directions may be used, as shown in FIG. 12D.

The arithmetic operation processing of the color conversion processor 311 in this embodiment uses a 3D lookup table processing and interpolation operation processing. However, the present invention is not limited to such specific processing. For example, the arithmetic operation processing may use another processing which can convert the conversion source color into the conversion destination color, e.g., matrix operation processing which changes matrix operation coefficients for respective color spaces. As processing using the matrix operation processing, the following processing may be made. For example, respective grid points store coefficients M11 to M33 in formula (16) below. The coefficients M11 to M33 are determined in accordance with Yin, Uin, and Vin, and formula (16) is calculated to obtain Yout, Uout, and Vout. Note that as a determination of M11 to M33, a coefficient stored at a grid point closest to Yin, Uin, and Vin may be calculated, or a coefficient may be calculated by interpolation operations from respective grid points.

$$\begin{vmatrix} Yout \\ Uout \\ Vout \end{vmatrix} = \begin{vmatrix} M11 & M12 & M13 \\ M21 & M22 & M23 \\ M31 & M32 & M33 \end{vmatrix} \begin{vmatrix} Yin \\ Uin \\ Vin \end{vmatrix} \quad (16)$$

Also, in the above embodiment, Y, U, and V signal values after conversion are set on respective grid points in FIG. 9. However, the present invention is not limited to this.

As the code image, a one- or two-dimensional barcode, or a QR code may be used. If a code image which includes position detection marks like the QR code is used, the need for moving the color capture frame to display the code image within it can be obviated.

Also, the code image 1301 which is described on the brochure or magazine and includes color value information, as shown in FIG. 13A, may include model information indicating compatibility to the image sensing apparatus used by the user. With this information, the system controller 109 can authenticate whether or not the image sensing apparatus can use a code image upon reading and analyzing the code image.

Note that means which form the image sensing apparatus and steps of the photographing method according to the embodiment of the present invention can be implemented by running a program stored in a RAM, ROM, and the like of a computer. This program and a computer-readable storage medium that records the program are included in the present invention.

With the above arrangement, even the limited user interface of the image sensing apparatus allows the user to easily and flexibly set a conversion source color and conversion destination color, thus implementing desired color conversion upon photographing by a simple operation. Especially, a color after change is acquired from code information indicating a color described on a book, brochure, or the like, and a desired color of an image displayed on the electronic viewfinder screen in real time can be converted into the acquired color, thus easily designating color conversion upon photographing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-307508, filed Oct. 21, 2005, which is hereby incorporated by reference herein in its entirety.

What is claimed is:

1. A camera for acquiring data from image data captured with an image sensing unit, and displaying processed image data, received from an image processing unit that processes the image data captured by the image sensing unit, that is to be recorded with a recording unit, comprising:

an acquisition unit that acquires a color value of a conversion destination from a code image included in the image data captured by the image sensing unit in response to a first operation performed with one member of a plurality of members arranged in the horizontal direction and used for inputting instructions;

a display unit that displays the image data output from the image processing unit and a frame on a screen;

a determination unit that determines a color value of a conversion target based on color information included in the frame of the image data displayed on the screen in response to a second operation performed with another member included in the horizontally-arranged plurality of members;

a setting unit adapted to set color conversion parameters of the image processing unit so as to convert colors within a predetermined range including the color value of the conversion target into colors within a predetermined range including the color value of the conversion destination on a color space, wherein the code image further includes model information indicating compatibility with said image sensing apparatus, and a checking unit that checks whether the code image is usable by said image sensing apparatus in accordance with the model information.

2. The apparatus according to claim 1, wherein said setting unit sets parameters of a three-dimensional lookup table for color conversion.

3. The apparatus according to claim 1, wherein said acquisition unit extracts the code image from image data displayed on the screen, and acquires the color value of the conversion destination.

4. The apparatus according to claim 1, wherein said acquisition unit extracts the code image from already captured image data, and acquires the color value of the conversion destination.

5. The apparatus according to claim 1,
wherein the code image includes information indicating a plurality of color values and color section names corresponding to the color values, and
said acquisition unit acquires the color section names from the code image, displays the acquired color section names on the screen, and acquires the color value corresponding to a selected color section name in accordance with selection from the color section names by a user.

6. A camera for determining a parameter from desired image data captured by an image sensing unit and displaying processed image data, received from an image processing unit that processes the image data captured by the image sensing unit, and to be recorded with a recording unit, comprising:

a determination unit that determines a color value of a conversion target based on color information included in a predetermined area of a desired already captured image in response to a first operation performed with one member of a plurality of members arranged in the horizontal direction and used for inputting instructions;

a display unit that displays the image data output from the image processing unit on a screen;

an acquisition unit that acquires a color value of a conversion destination from a code image included in the image data displayed on the screen in response to a second operation performed with another member included in the horizontally-arranged plurality of members;

a setting unit that sets color conversion parameters of the image processing unit so as to convert colors within a predetermined range including the color value of the conversion target into colors within a predetermined range including the color value of the conversion destination on a color space;

a conversion unit that executes color conversion processing for the desired already captured image using the color conversion parameters set by said setting unit, wherein the code image further includes model information indicating compatibility with said image sensing apparatus, and a checking unit that checks if the code image is usable by said image sensing apparatus in accordance with the model information.

7. A method of controlling a camera which comprises an image sensing unit, a control unit that executes an image processing operation on image data obtained by the image sensing unit, and a recording unit that records the image data obtained from the control unit, comprising:

an acquisition step of acquiring a color value of a conversion destination from a code image included in the image data captured by the image sensing unit in response to a first operation performed with one member of a plurality of members arranged in the horizontal direction and used for inputting instructions;

a display step of displaying the image data obtained from the control unit and a frame on a screen;

a determination step of determining a color value of a conversion target based on color information included in the frame of the image data displayed on the screen in response to a second operation performed with another member included in the horizontally-arranged plurality of members;

a setting step of setting color conversion parameters of the control unit so as to convert colors within a predetermined range including the color value of the conversion target into colors within a predetermined range including the color value of the conversion destination on a color space, wherein the code image further includes model information indicating compatibility with the image sensing apparatus, and a checking step of checking if the code image is usable by the image sensing apparatus in accordance with the model information.

8. The method according to claim 7, wherein said setting step includes a step of setting parameters of a three-dimensional lookup table for color conversion.

9. The method according to claim 7, wherein said acquisition step includes a step of extracting the code image from image data displayed on the screen, and acquiring the color value of the conversion destination.

10. The method according to claim 7, wherein said acquisition step includes a step of extracting the code image from already captured image data, and acquiring the color value of the conversion destination.

11. The method according to claim 7,
wherein the code image includes information indicating a plurality of color values and color section names corresponding to the color values, and
said acquisition step includes steps of:
acquiring color section names from the code image;
displaying the acquired color section names on the screen; and
acquiring the color value corresponding to a selected color section name in accordance with selection from the color section names by a user.

12. A method of controlling a camera which comprises image sensing unit, a control unit that executes an image processing operation on image data obtained by the image sensing unit, and recording unit that records the image data obtained from the control unit, comprising:

a determination step of determining a color value of a conversion target based on color information included in a predetermined area of a desired already captured image already captured by the image sensing unit and represented by the image data obtained by the image sensing unit in response to a first operation performed with one member of a plurality of members arranged in the horizontal direction and used for inputting instructions;

a display step of displaying the image data obtained from the control unit on a screen;

an acquisition step of acquiring a color value of the conversion destination from a code image included in the image data displayed on the screen in response to a second operation performed with another member included in the horizontally-arranged plurality of members;

a setting step of setting color conversion parameters of the image processing unit so as to convert colors within a predetermined range including the color value of the conversion target into colors within a predetermined range including the color value of the conversion destination on a color space;

a conversion step of executing color conversion processing for the desired already captured image using the color conversion parameters set in said setting step, wherein the code image further includes model information indicating compatibility with an image sensing apparatus; and a checking step of checking if the code image is usable by the image sensing apparatus in accordance with the model information.

13. A computer program, stored in a computer-readable storage medium, for making a computer execute a method of controlling an image sensing apparatus according to claim 7.

14. A computer program, stored in a computer-readable storage medium, for making a computer execute a method of controlling an image sensing apparatus according to claim 12.

15. A computer-readable storage medium storing a computer program for making a computer execute a method of controlling an image sensing apparatus according to claim 7.

16. A computer-readable storage medium storing a computer program for making a computer execute a method of controlling an image sensing apparatus according to claim 12.

* * * * *